(12) United States Patent
Kishi et al.

(10) Patent No.: US 10,753,462 B2
(45) Date of Patent: Aug. 25, 2020

(54) VEHICLE TRANSMISSION CONTROL APPARATUS

(71) Applicant: Honda Motor Co., Ltd., Tokyo (JP)

(72) Inventors: Takayuki Kishi, Wako (JP); Yoshiaki Konishi, Wako (JP); Akira Kito, Wako (JP); Toshiyuki Mizuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 120 days.

(21) Appl. No.: 16/175,701

(22) Filed: Oct. 30, 2018

(65) Prior Publication Data
US 2019/0128408 A1 May 2, 2019

(30) Foreign Application Priority Data
Nov. 2, 2017 (JP) .................................. 2017-212698

(51) Int. Cl.
*F16H 61/02* (2006.01)
*F16H 59/44* (2006.01)

(52) U.S. Cl.
CPC ......... *F16H 61/0213* (2013.01); *F16H 59/44* (2013.01); *F16H 2061/0225* (2013.01); *F16H 2061/0227* (2013.01); *F16H 2061/0244* (2013.01)

(58) Field of Classification Search
None
See application file for complete search history.

(56) References Cited

U.S. PATENT DOCUMENTS

| 8,700,251 | B1* | 4/2014 | Zhu ...................... G01C 21/34 701/25 |
| 2008/0182718 | A1* | 7/2008 | Ido ......................... F16H 61/16 477/125 |
| 2013/0073156 | A1 | 3/2013 | Takeuchi et al. |
| 2017/0299052 | A1* | 10/2017 | Kakihara ............... F16H 59/18 |
| 2018/0043896 | A1* | 2/2018 | Lee ....................... B60W 30/09 |

FOREIGN PATENT DOCUMENTS

| DE | 19916808 A1 | 11/2000 |
| JP | 2007315414 A | 12/2007 |
| JP | 2010242944 A | 10/2010 |
| JP | 2013068247 A | 4/2013 |
| JP | 2016222150 A | 12/2016 |

* cited by examiner

*Primary Examiner* — Timothy Hannon
(74) *Attorney, Agent, or Firm* — Duft & Bornsen, PC

(57) ABSTRACT

A vehicle transmission control apparatus including a manual shift instructing portion outputting a manual shift instruction for upshifting or downshifting a transmission, and an electric control unit including a microprocessor and a memory to control a shift operation. The microprocessor controls the shift operation in accordance with a first shift chart stored in the memory based on vehicle information before the manual shift instruction is output, controls the shift operation in accordance with the manual shift instruction when the manual shift instruction is output, and controls the shift operation in accordance with a second shift chart stored in the memory based on the vehicle information when a predetermined mode switch condition is established after the manual shift instruction is output.

10 Claims, 15 Drawing Sheets

VEHICLE TRANSMISSION CONTROL APPARATUS

CROSS-REFERENCE TO RELATED APPLICATION

This application is based upon and claims the benefit of priority from Japanese Patent Application No. 2017-212698 filed on Nov. 2, 2017, the content of which is incorporated herein by reference.

BACKGROUND OF THE INVENTION

Field of the Invention

This invention relates to a vehicle transmission control apparatus for controlling a shift operation of a transmission mounted on a vehicle having a self-driving capability.

Description of the Related Art

Conventionally, there is a known apparatus of this type, configured to generate an action plan including a route to a destination and to control a shift operation of a vehicle transmission based on the action plan so that the vehicle travels along the route in a self-driving. Such an apparatus is described in Japanese Unexamined Patent Publication No. 2016-222150 (JP2016-222150A), for example. In the apparatus described in JP2016-222150A, a transmission is automatically upshifted and downshifted based on a required driving force and a vehicle speed in accordance with a predefined shift chart.

The apparatus according to JP2016-222150A automatically performs shift operations of a self-driving vehicle transmission independently of passenger intentions. However, a desire to have shift operations performed taking passenger intentions into account has also been expressed even with regard to self-driving vehicles.

SUMMARY OF THE INVENTION

An aspect of the present invention is a vehicle transmission control apparatus for controlling a shift operation of a transmission mounted on a self-driving vehicle having a self-driving capability, including: a manual shift instructing portion configured to output a manual shift instruction for upshifting or downshifting the transmission; and an electric control unit including a microprocessor and a memory connected to the microprocessor. The microprocessor is configured to perform: acquiring vehicle information including a required driving force data and a vehicle speed data necessary for self-diving the self-driving vehicle in accordance with an action plan; and controlling the shift operation of the transmission based on the manual sift instruction output by the manual shift instructing portion and the vehicle information acquired in the microprocessor, wherein the controlling includes: controlling the shift operation in accordance with a first shift chart stored in the memory in advance based on the vehicle information acquired in the microprocessor, in a first travel mode, before the manual shift instruction is output by the manual shift instructing portion; controlling the shift operation in accordance with the manual shift instruction, in a second travel mode, when the manual shift instruction is output by the manual shift instructing portion; and controlling the shift operation in accordance with a second shift chart stored in the memory in advance based on the vehicle information acquired in the microprocessor, in a third travel mode, when a predetermined mode switch condition is established after the manual shift instruction is output by the manual shift instructing portion.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
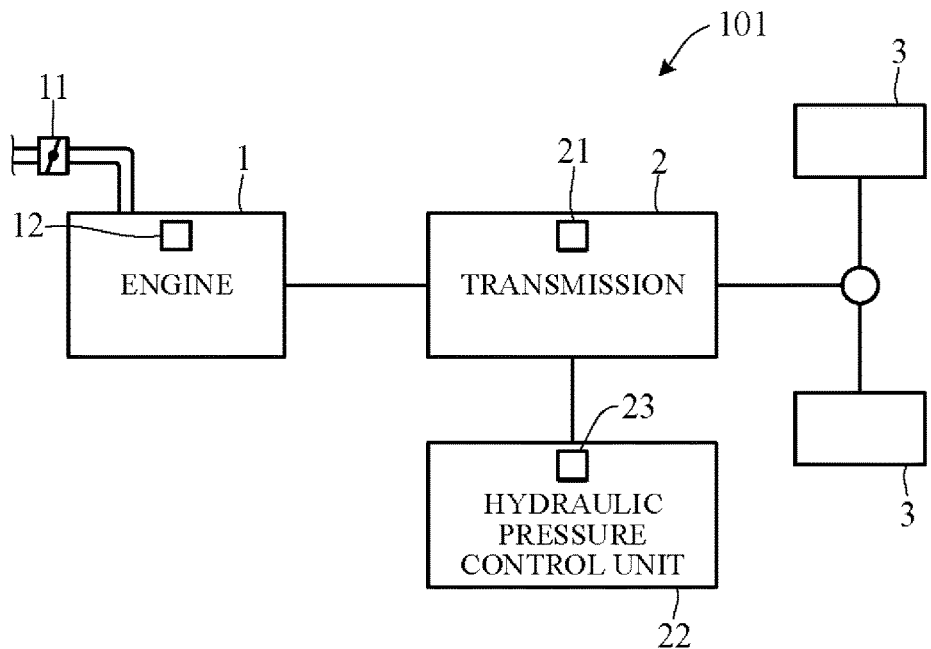
FIG. 1 is a diagram showing a configuration overview of a driving system of a self-driving vehicle incorporating a vehicle transmission control apparatus according to an embodiment of the present invention.

Hereinafter, an embodiment of the present invention is explained with reference to FIGS. 1 to 20. A vehicle transmission control apparatus according to an embodiment of the present invention is applied to a vehicle (self-driving vehicle) having a self-driving capability. FIG. 1 is a diagram showing a configuration overview of a driving system of a self-driving vehicle 101 incorporating a vehicle transmission control apparatus according to the present embodiment. Herein, the self-driving vehicle may be sometimes called "subject vehicle" to differentiate it from other vehicles. The vehicle 101 is not limited to driving in a self-drive mode requiring no driver driving operations but is also capable of driving in a manual drive mode by driver operations.

As shown in FIG. 1, the vehicle 101 includes an engine 1 and a transmission 2. The engine 1 is an internal combustion engine (e.g., gasoline engine) wherein intake air supplied through a throttle valve 11 and fuel injected from an injector 12 are mixed at an appropriate ratio and thereafter ignited by a sparkplug or the like to burn explosively and thereby generate rotational power. A diesel engine or any of various other types of engine can be used instead of a gasoline engine. Air intake volume is metered by the throttle valve 11.

The transmission 2, which is installed in a power transmission path between the engine 1 and drive wheels 3, varies speed ratio of rotation of from the engine 1, and converts and outputs torque from the engine 1. The rotation of speed converted by the transmission 2 is transmitted to the drive wheels 3, thereby propelling the vehicle 101. Optionally, the vehicle 101 can be configured as an electric vehicle or hybrid vehicle by providing a drive motor as a drive power source in place of or in addition to the engine 1.

The transmission 2 is, for example, a stepped transmission enabling stepwise speed ratio (gear ratio) shifting in accordance with multiple (e.g. seven) speed stages. Optionally, a continuously variable transmission enabling stepless speed ratio shifting can be used as the transmission 2. Although omitted in the drawings, power from the engine 1 can be input to the transmission 2 through a torque converter. The transmission 2 can, for example, incorporate a dog clutch, friction clutch or other engaging element 21. A hydraulic pressure control unit 22 can shift speed stage of the transmission 2 by controlling flow of oil to the engaging element 21. The hydraulic pressure control unit 22 includes a solenoid valve or other valve mechanism operated by electric signals (called "shift actuator 23" for sake of convenience), and an appropriate speed stage can be implemented by changing flow of hydraulic pressure to the engaging element 21 in response to operation of the shift actuator 23.

Figure 2:
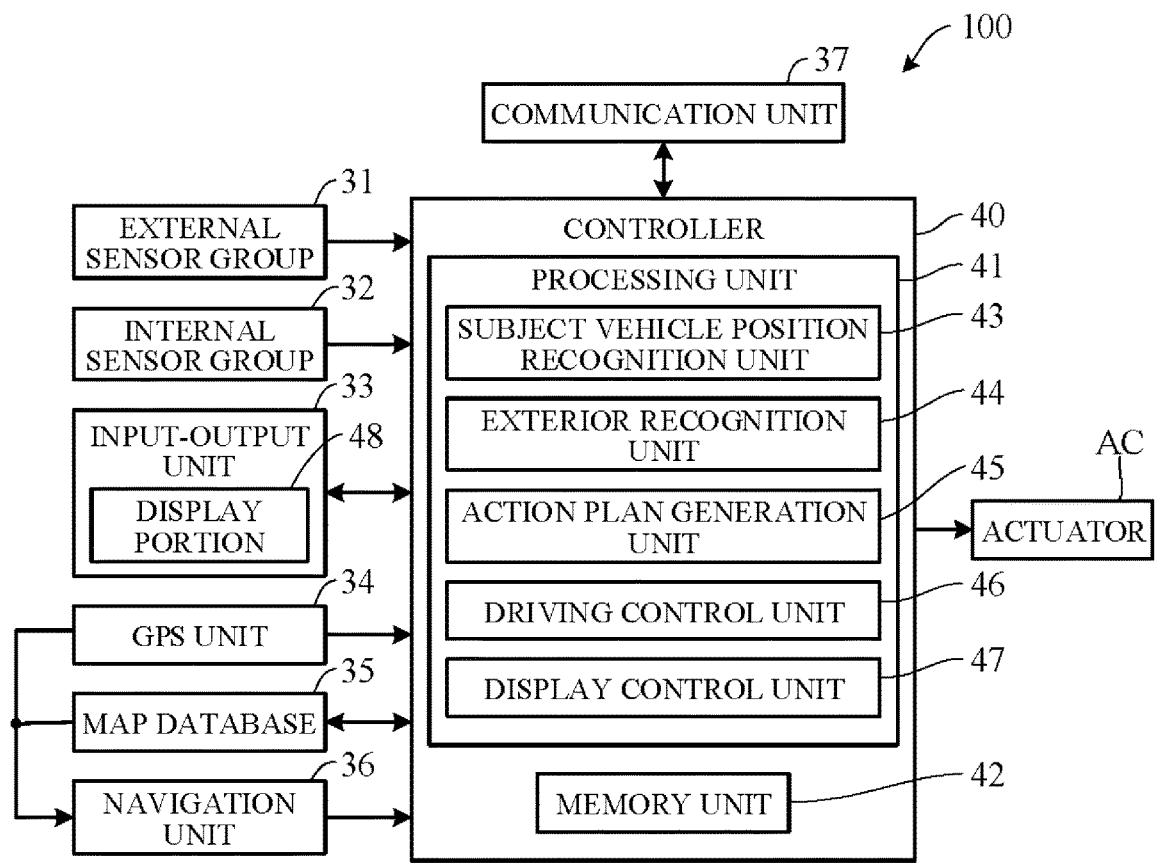
FIG. 2 is a block diagram schematically illustrating overall configuration of a vehicle control system incorporating a vehicle transmission control apparatus according to an embodiment of the present invention.

FIG. 2 is a block diagram schematically illustrating overall configuration of a vehicle control system 100 incorporating a vehicle transmission control apparatus according to an embodiment of the present invention. As shown in FIG. 2, the vehicle control system 100 is configured centered on a controller 40 and includes mainly of the controller 40, and as members electrically connected thereto through CAN (Controller Area Network) communication or the like, an external sensor group 31, an internal sensor group 32, an input-output unit 33, a GPS unit 34, a map database 35, a navigation unit 36, a communication unit 37, and actuators AC.

The term external sensor group 31 herein is a collective designation encompassing multiple sensors (external sensors) for detecting external circumstances constituting subject vehicle ambience data. For example, the external sensor group 31 includes, inter alia, a LIDAR (Light Detection and Ranging) for measuring distance from the vehicle to ambient obstacles by measuring scattered light produced by laser light radiated from the subject vehicle in every direction, a CCD, CMOS or other image sensor-equipped on-board cameras for imaging subject vehicle ambience (forward, reward and sideways), and a RADAR (Radio Detection and Ranging) for detecting other vehicles and obstacles around the subject vehicle by radiating electromagnetic waves and detecting reflected waves.

The term internal sensor group 32 herein is a collective designation encompassing multiple sensors (internal sensors) for detecting subject vehicle driving state. For example, the internal sensor group 32 includes, inter alia, an engine speed sensor for detecting engine rotational speed, a vehicle speed sensor for detecting subject vehicle running speed, acceleration sensors for detecting subject vehicle forward-rearward direction acceleration and lateral acceleration, respectively, and a yaw rate sensor for detecting rotation angle speed around a vertical axis through subject vehicle center of gravity. The internal sensor group 32 also includes sensors for detecting driver driving operations in manual drive mode, including, for example, accelerator pedal operations, brake pedal operations, steering wheel operations and the like. In addition, the internal sensor group 32 also includes switches (paddle switches discussed later) for detecting manual shift operations by the driver, and an on-board camera for imaging the driver's face.

The term input-output unit 33 is used herein as a collective designation encompassing apparatuses receiving instructions input by the driver and outputting information to the driver. For example, the input-output unit 33 includes, inter alia, switches which the driver uses to input various instructions by operating operation members, a microphone which the driver uses to input voice instructions, a display for presenting information to the driver via displayed images, and a speaker for presenting information to the driver by voice. The switches include a travel mode select switch for selecting one among multiple travel modes (normal mode, sport mode and the like), and a self/manual drive select switch for instructing either self-drive mode or manual drive mode. A display portion 48 for displaying current speed stage is included as one element of the input-output unit 33 (display thereof).

The GPS unit 34 includes a GPS receiver for receiving position determination signals from multiple GPS satellites, and measures absolute position (latitude, longitude and the like) of the subject vehicle based on the signals received from the GPS receiver.

The map database 35 is a unit storing general map data used by the navigation unit 36 and is, for example, implemented using a hard disk. The map data include road position data and road shape (curvature etc.) data, along with intersection and road branch position data. The map data stored in the map database 35 are different from high-accuracy map data stored in a memory unit 42 of the controller 40.

The navigation unit 36 retrieves target road routes to destinations input by the driver and performs guidance along selected target routes. Destination input and target route guidance is performed through the input-output unit 33.

Target routes are computed based on subject vehicle current position measured by the GPS unit 34 and map data stored in the map database 35.

The communication unit 37 communicates through networks including the Internet and other wireless communication networks to access servers (not shown in the drawings) to acquire map data, traffic data and the like, periodically or at arbitrary times. Acquired map data are output to the map database 35 and/or memory unit 42 to update their stored map data. Acquired traffic data include congestion data and traffic light data including, for instance, time to change from red light to green light.

The actuators AC are provided to perform driving of the vehicle 101. The actuators AC include a throttle actuator for adjusting opening angle of the throttle valve 11 of the engine 1 (throttle opening angle), a shift actuator 23 for changing speed stage of the transmission 2, a brake actuator for operating a braking unit, and a steering actuator for driving a steering unit.

The controller 40 is constituted by an electronic control unit (ECU). Optionally, the controller 40 can be integrally configured by consolidating multiple function-differentiated ECUs such as an engine control ECU, a transmission control ECU and so on. The controller 40 incorporates a computer including a CPU or other processing unit (a microprocessor) 41, the memory unit (a memory) 42 of RAM, ROM, hard disk and the like, and other peripheral circuits not shown in the drawings.

The memory unit 42 stores high-accuracy detailed map data including, inter alia, lane center position data and lane boundary line data. More specifically, road data, traffic regulation data, address data, facility data, telephone number data and the like are stored as map data. The road data include data identifying roads by type such as expressway, toll road and national highway, and data on, inter alia, number of road lanes, individual lane width, road gradient, road 3D coordinate position, lane curvature, lane merge and branch point positions, and road signs. The traffic regulation data include, inter alia, data on lanes subject to traffic restriction or closure owing to construction work and the like. The memory unit 42 also stores a shift map (shift chart) serving as a shift operation reference.

As functional configurations, the processing unit 41 includes a subject vehicle position recognition unit 43, an exterior recognition unit 44, an action plan generation unit 45, a driving control unit 46, and a display control unit 47.

The subject vehicle position recognition unit 43 recognizes map position of the subject vehicle (subject vehicle position) based on subject vehicle position data calculated by the GPS unit 34 and map data stored in the map database 35. Optionally, the subject vehicle position can be recognized using map data (building shape data and the like) stored in the memory unit 42 and ambience data of the vehicle 101 detected by the external sensor group 31, whereby the subject vehicle position can be recognized with high accuracy. Optionally, when the subject vehicle position can be measured by sensors installed externally on the road or by the roadside, the subject vehicle position can be recognized with high accuracy by communicating with such sensors through the communication unit 37.

The exterior recognition unit 44 recognizes external circumstances around the subject vehicle based on signals from cameras, LIDERs, RADARs and the like of the external sensor group 31. For example, it recognizes position, speed and acceleration of nearby vehicles driving in the vicinity of the subject vehicle, position of vehicles stopped or parked in the vicinity of the subject vehicle, and position and state of other objects. Other objects include traffic signs, traffic lights, road boundary and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 45 generates a subject vehicle driving path (target path) from current time point to a certain time ahead based on, for example, a target route computed by the navigation unit 36, subject vehicle position recognized by the subject vehicle position recognition unit 43, and external circumstances recognized by the exterior recognition unit 44. When multiple paths are available on the target route as target path candidates, the action plan generation unit 45 selects from among them the path that optimally satisfies legal compliance, safe efficient driving and other criteria, and defines the selected path as the target path. The action plan generation unit 45 then generates an action plan matched to the generated target path. An action plan is also called "travel plan".

The action plan includes action plan data set for every unit time Δt (e.g., 0.1 sec) between current time point and a predetermined time period T (e.g., 5 sec) ahead, i.e., includes action plan data set in association with every unit time Δt interval. The action plan data include subject vehicle position data and vehicle state data for every unit time Δt. The position data are, for example, data indicating 2D coordinate position on road, and the vehicle state data are vehicle speed data indicating vehicle speed, direction data indicating subject vehicle direction, and the like. The vehicle state data can be determined from position data change of successive unit times Δt. Action plan is updated every unit time Δt.

Figure 3:
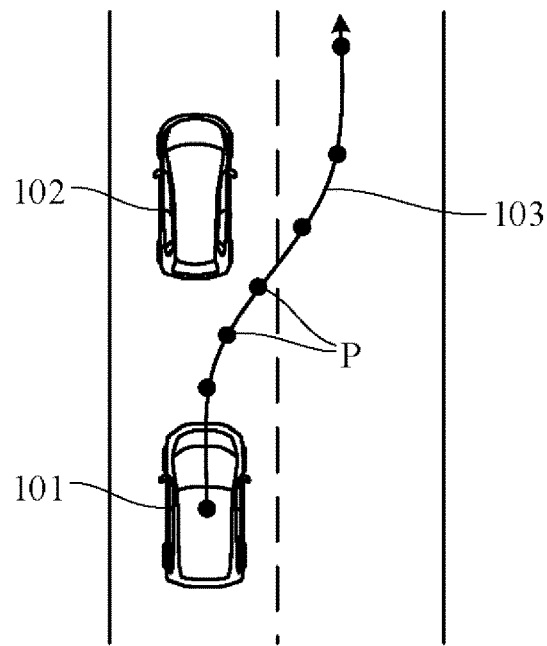
FIG. 3 is a diagram showing an example of an action plan generated by an action plan generation unit of FIG. 2.

FIG. 3 is a diagram showing an action plan generated by the action plan generation unit 45. FIG. 3 shows a scene depicting an action plan for the subject vehicle 101 when changing lanes and overtaking a forward vehicle 102 (preceding vehicle). Points P in FIG. 3 correspond to position data at every unit time Δt between current time point and predetermined time period T ahead. A target path 103 is obtained by connecting the points P in time order.

In self-drive mode, the driving control unit 46 controls the actuators AC to drive the subject vehicle 101 along target path 103 generated by the action plan generation unit 45. Specifically, it controls the throttle actuator, shift actuator 23, brake actuator and steering actuator so as to drive the subject vehicle 101 through the points P of the unit times Δt in FIG. 3. In manual drive mode, the driving control unit 46 controls the actuators AC in accordance with driving instructions by the driver (accelerator opening angle and the like) acquired from the internal sensor group 32.

Still more particularly, among components of the action plan generated by the action plan generation unit 45 in self-drive mode, the driving control unit 46 uses vehicle speeds (target vehicle speeds) on the target path 103 (FIG. 3) at the points P of the individual unit times Δt to calculate accelerations (target accelerations) for the individual unit times Δt. In addition, the driving control unit 46 calculates required driving force for achieving the target accelerations taking running resistance caused by road gradient and the like into account. Then, the driving control unit 46 feedback controls the actuators AC to control actual accelerations detected by the internal sensor group 32, for example, to the target accelerations.

The display control unit 47 outputs control signals to the input-output unit 33 to control display mode of a display (part of input-output unit 33) installed in front of a driver's seat. For example, current speed stage is displayed on the display (display portion 48).

In the present embodiment, a manual/self drive select switch provided as a component of the input-output unit 33 (FIG. 8) can be operated to switch a drive mode between a self-drive mode enabling self-drive functions and a manual drive mode disabling self-drive functions. In addition, a travel mode select switch provided as a component of the input-output unit 33 (FIG. 8) can be operated to switch a travel mode between a normal mode that balances fuel economy performance and power performance and a sport mode that prioritizes power performance over fuel economy performance. As a result, four drive modes are established depending on operation of the manual/self drive select switch and the travel mode select switch, i.e., normal mode in manual drive mode (manual normal mode), sport mode in manual drive mode (manual sport mode), normal mode in self-drive mode (self-drive normal mode), and sport mode in self-drive mode (self-drive sport mode).

The manual/self drive select switch is, for example, a pressure-responsive switch. The driving control unit 46 switches to self-drive mode when the manual/self drive select switch is turned ON and to manual drive mode when it is turned OFF. Optionally, drive mode switching, i.e., switching from manual drive mode to self-drive mode or from self-drive mode to manual drive mode, can be performed automatically in response to establishment of predetermined drive conditions irrespective of operation of the manual/self drive select switch.

The travel mode select switch is, for example, a pressure-responsive switch. The driving control unit 46 switches to sport mode when the travel mode select switch is turned ON and to normal mode when it is turned OFF. Optionally, a shift lever operable to D range (drive range) and S range (sport range) can be provided, the mode select switch be adapted to detect operation of the shift lever, and the driving control unit 46 be adapted to switch to normal mode when the shift lever is operated to D range and to sport mode when the shift lever is operated to S range. Also optionally, the travel mode select switch can be adapted to enable switching not only to normal mode and sport mode but also to other drive modes such as an eco-mode that prioritizes fuel economy performance over power performance.

The driving control unit 46 controls shift operation of the transmission 2 by outputting control signals to the shift actuator 23 using a shift map stored in the memory unit 42 in advance to serve as a shift operation reference.

Figure 4:
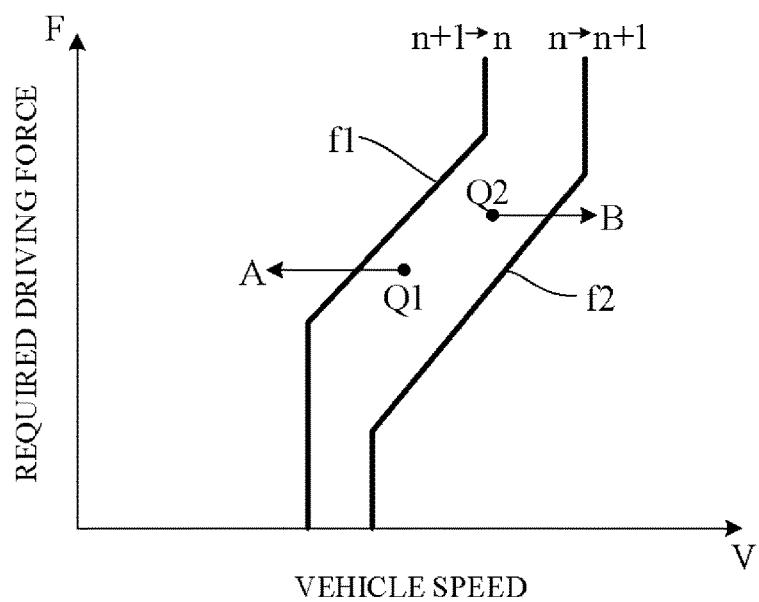
FIG. 4 is a diagram showing an example of a shift map in a manual normal mode.

FIG. 4 is a diagram showing an example of the shift map stored in the memory unit 42, particularly an example of the shift map in manual normal mode. In the drawing, horizontal axis is scaled for vehicle speed V and vertical axis for required driving force F. Required driving force F is in one-to-one correspondence to accelerator opening angle (in self-drive mode, simulated accelerator opening angle) or throttle opening angle, and required driving force F increases with increasing accelerator opening angle or throttle opening angle. Therefore, the vertical axis can instead be scaled for accelerator opening angle or throttle opening angle. Characteristic curve f1 is an example of a downshift curve corresponding to downshift from n+1 stage to n stage and characteristic curve f2 is an example of an upshift curve corresponding to upshift from n stage to n+1 stage.

For example, considering downshift from operating point Q1 in FIG. 4, in a case where vehicle speed V decreases under constant required driving force F, the transmission 2 downshifts from n+1 stage to n stage when operating point Q1 crosses a downshift curve (characteristic curve f1; arrow A). Also in a case where required driving force F decreases under constant vehicle speed V, the transmission 2 downshifts when operating point Q1 crosses the downshift curve.

On the other hand, considering upshift from operating point Q2, in a case where vehicle speed V increases under constant required driving force F, the transmission 2 upshifts from n stage to n+1 stage when operating point Q2 crosses an upshift curve (characteristic curve f2; arrow B). Also in a case where required driving force F decreases under constant vehicle speed V, the transmission 2 also upshifts when operating point Q2 crosses the upshift curve. The downshift curve and upshift curve are shifted further to high vehicle speed side in proportion as the speed stage is greater.

Although omitted in the drawings, the downshift curve associated with downshift from n+1 stage to n stage in manual sport mode is, for example, a characteristic curve obtained by shifting the downshift curve in manual normal mode (e.g., characteristic curve f1) to high vehicle speed side. Similarly, the upshift curve associated with upshift from n state to n+1 stage in manual sport mode is, for example, a characteristic curve obtained by shifting the upshift curve in manual normal mode (e.g., characteristic curve f2) to high vehicle speed side. As a result, the vehicle travels in a lower speed stage during manual sport mode than during manual normal mode, thereby enabling vehicle propulsion force to be generated with good responsiveness.

Figure 10:
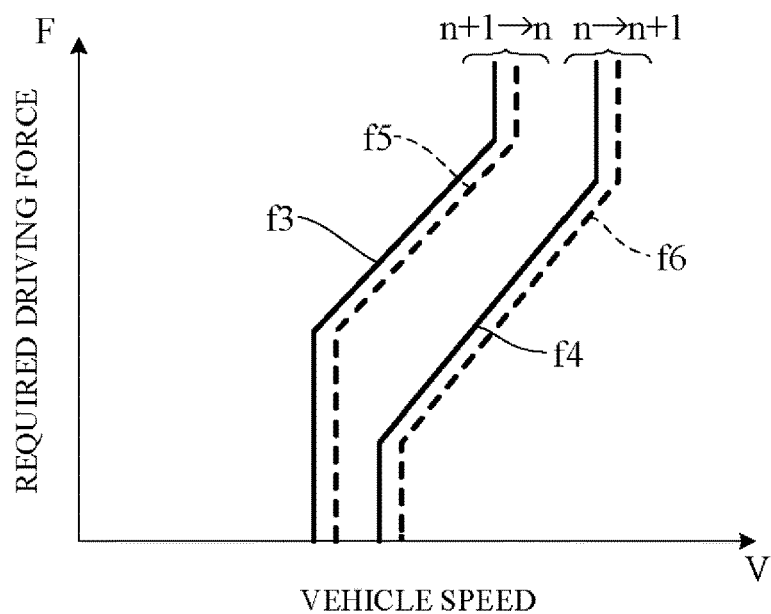
FIG. 10 is a diagram showing examples of shift maps used in a normal mode of the self-drive mode by the vehicle transmission control apparatus according to the embodiment of the invention.
Figure 11:
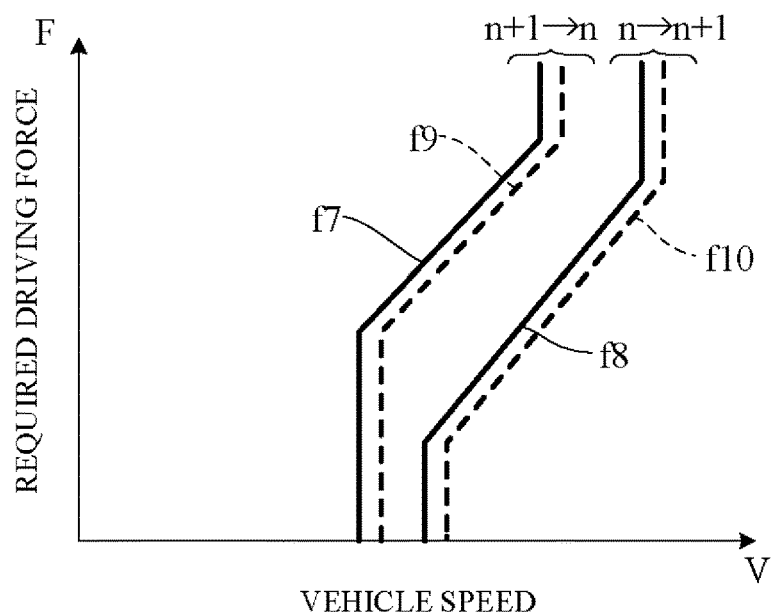
FIG. 11 is a diagram showing examples of shift maps used in a sport mode of the self-drive mode by the vehicle transmission control apparatus according to the embodiment of the invention.

Moreover, in self-drive normal mode, the downshift curve associated with downshift from n+1 stage to n stage is, for example, identical to the downshift curve in manual normal mode (characteristic curve f1), and the upshift curve associated with upshift from n stage to n+1 stage is, for example, identical to the upshift curve in manual normal mode (characteristic curve f2). Further, in self-drive sport mode, the downshift curve associated with downshift from n+1 stage to n stage is, for example, identical to the downshift curve in manual sport mode, and the upshift curve associated with upshift from n stage to n+1 stage is, for example, identical to the upshift curve in manual sport mode. Examples of the shift maps of these self-drive normal and self-drive sport modes are taken up later (FIGS. 10 and 11).

Figure 5:
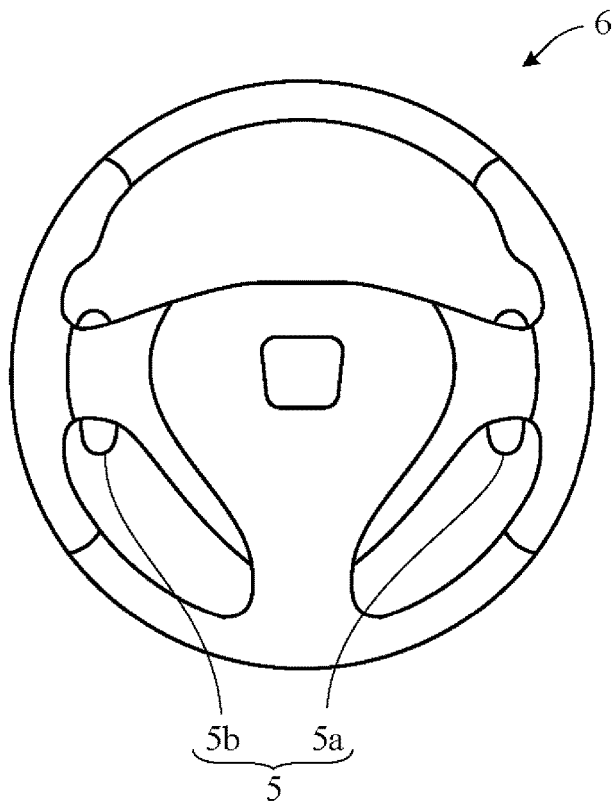
FIG. 5 is a front view of a steering wheel showing incorporation of paddle switches.

The vehicle transmission control apparatus according to the embodiment of the present invention is configured to change automatically shift of the transmission in accordance with a shift map but can be further configured also to change shift of the transmission in response to operation of paddle switches. FIG. 5 is a front view of a steering wheel 6 showing incorporation of paddle switches. As shown in FIG. 5, a pair of laterally symmetrical paddle switches 5 (5*a* and 5*b*) is installed on a rear side of the steering wheel 6 near grip members.

One of the paddle switches, e.g., the paddle switch 5*a* on the right side, is configured as an upshift switch for instructing upshift from n stage to n+1 stage and outputs an upshift signal with each pressing operation. The other paddle switch, e.g., the paddle switch 5*b* on the left side, is configured as a downshift switch for instructing downshift from n+1 stage to n stage and outputs a downshift signal with each pressing operation.

Figure 6:
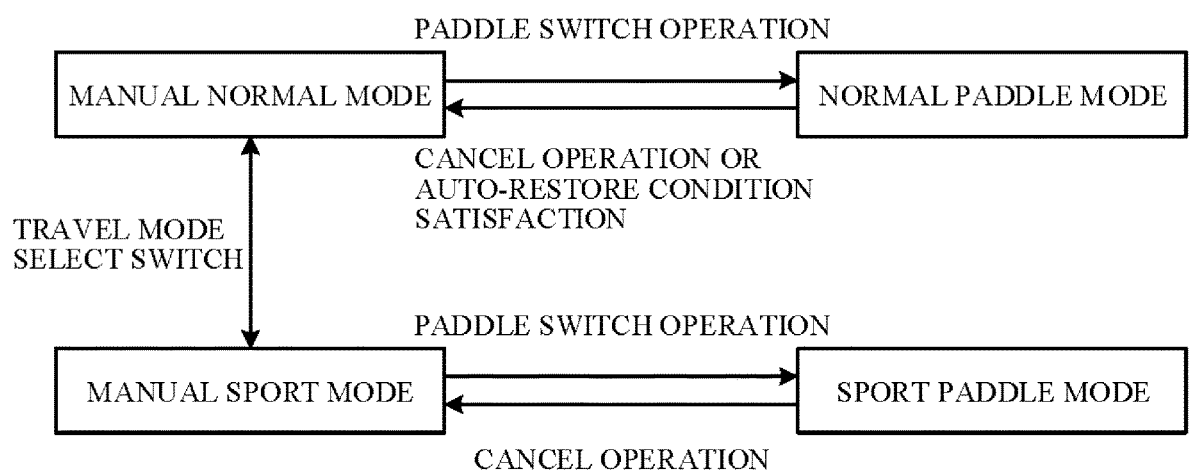
FIG. 6 is a transition diagram of travel modes in manual drive mode by the vehicle transmission control apparatus according to the embodiment of the invention.

FIG. 6 is a transition diagram of travel modes in manual drive mode. As shown in FIG. 6, when a paddle switch 5 is operated in manual normal mode, travel mode transitions to paddle mode (called "normal paddle mode" for sake of convenience). In normal paddle mode, the driving control unit 46 outputs control signals to the shift actuator 23 in accordance with upshift signals or downshift signals from the paddle switches 5, whereby the transmission 2 is upshifted or downshifted independently of the shift map of FIG. 4. The speed stage after the upshift or after the downshift is thereafter maintained so long as no cancel operation of normal paddle mode is performed or so long as no auto-restore condition arises.

The cancel operation of normal paddle mode is performed, for example, by keeping a paddle switch 5 pressed for a predetermined time (e.g., 2 seconds) or longer. The auto-restore condition is established when, for example, the subject vehicle 101 is determined to be stopping or traveling in cruise mode. When the cancel operation of normal paddle mode is performed or an auto-restore condition arises, manual normal mode is restored. The driving control unit 46 thereafter performs automatic shift control of the transmission in accordance with the shift map of FIG. 4.

When the paddle switches 5 are operated in manual sport mode, travel mode transitions to paddle mode (called "sport paddle mode" for sake of convenience). In sport paddle mode, the driving control unit 46 outputs control signals to the shift actuator 23 in accordance with upshift signals or downshift signals from the paddle switches 5, whereby the transmission 2 is upshifted or downshifted independently of the shift map. The speed stage after the upshift or after the downshift is thereafter maintained so long as no cancel operation of sport paddle mode is performed.

The cancel operation of sport paddle mode is performed similarly to the cancel operation of normal paddle mode by, for example, keeping a paddle switch 5 pressed for a predetermined time (e.g., 2 seconds) or longer. When the cancel operation of sport paddle mode is performed, manual sport mode is restored. The driving control unit 46 thereafter performs automatic shift control of the transmission in accordance with the shift map. In sport paddle mode, unlike in normal paddle mode, travel mode is not automatically switched even if the subject vehicle 101 travels in another mode like cruise mode.

Thus in manual drive mode, the transmission 2 is upshifted and downshifted in response to operations of the paddle switches 5. The driver can therefore freely perform shift operations of the transmission at desired times in keeping with his or her intention and thereby experience good acceleration and deceleration feel. Moreover, since in normal paddle mode, manual normal mode is automatically restored when an auto-restore condition is satisfied, the driver is freed from the need to perform troublesome cancel operations of normal paddle mode. Furthermore, since in sport paddle mode, the speed stage is maintained until a cancel operation is performed, the vehicle can travel in a speed stage reliably reflecting the driver's intention. In normal paddle mode and sport paddle mode, the display control unit 47 outputs control signals to the display portion 48 so as to display the current speed stage on the display portion 48. The driver can therefore operate the paddle switches 5 with the current speed stage in mind.

A point requiring attention here is that during vehicle self-driving, the transmission is automatically shifted, without consideration to driver intention, in response to vehicle speed and required driving force, based on a predefined shift map. However, even in a vehicle traveling in self-driving, some drivers may, such as when seated in the driver's seat and watching the road ahead, feel an urge to upshift or downshift the transmission 2 at personally preferred arbitrary times. However, allowing such arbitrary shifts in response to operation of the paddle switches 5 in the same way as in manual drive mode would during self-drive mode driving lead to problems such as pointed out below.

Figure 7:
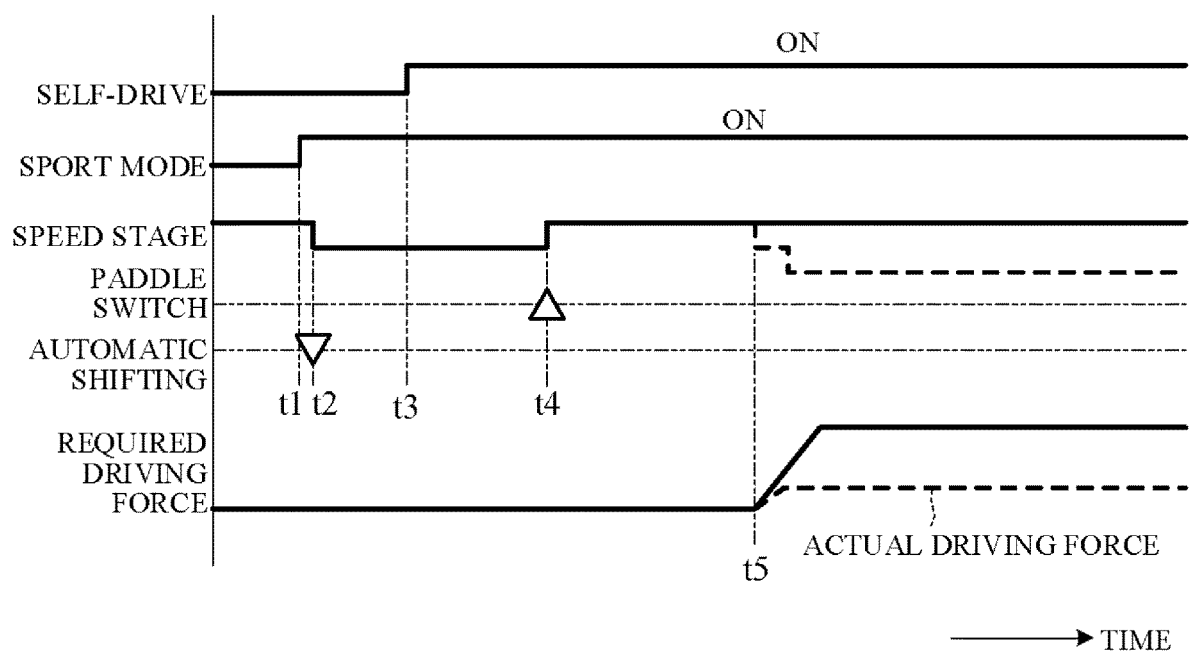
FIG. 7 is a time chart showing an example of disadvantageous operation arising in a case where a shift mode by an operation of a paddle switch is applied to a self-drive mode.

FIG. 7 is a time chart showing an example of disadvantageous operation arising in a case where a shift mode of the transmission by operation of paddle switch 5 in a manual drive mode is applied to a self-drive mode. In FIG. 7, upshift instruction by the upshift switch 5*a* operation or upshift instruction by automatic shifting is indicated by an up-pointing triangle and downshift instruction by the downshift switch 5*b* operation or downshift instruction by automatic shifting is indicated by a down-pointing triangle.

If the travel mode select switch is turned ON at time t1 during traveling in manual normal mode, travel mode switches to manual sport mode, and the transmission 2 automatically downshifts at time t2, for example. If the manual/self drive select switch is thereafter turned ON at time t3, travel mode switched to self-drive sport mode. In this state, if one of the paddle switches 5 (the upshift switch 5*a*) is turned ON at time t4, the transmission 2 upshifts by one stage.

If required driving force (solid line) should thereafter increase at time t5 owing to, for example, implementation of an action plan for overtaking a forward vehicle, hill climbing, following a forward vehicle or the like, a downshift as indicated by a dashed line becomes necessary in order to meet the required driving force. However, when operation of the paddle switch 5 during self-driving fixes the speed stage similarly to in manual driving in sport paddle mode, as indicated by solid line in FIG. 7, actual driving force is apt to vary as indicated by a dashed line in FIG. 7 and not achieve the required driving force. Therefore, adequate accelerating force may not be achieved in self-driving, and a risk arises of it becoming difficult to achieve forward vehicle overtake traveling, hill-climb traveling, forward vehicle follow traveling or the like. In order to overcome this disadvantage, the vehicle transmission control apparatus according to the embodiment is configured as set out below.

Figure 8:
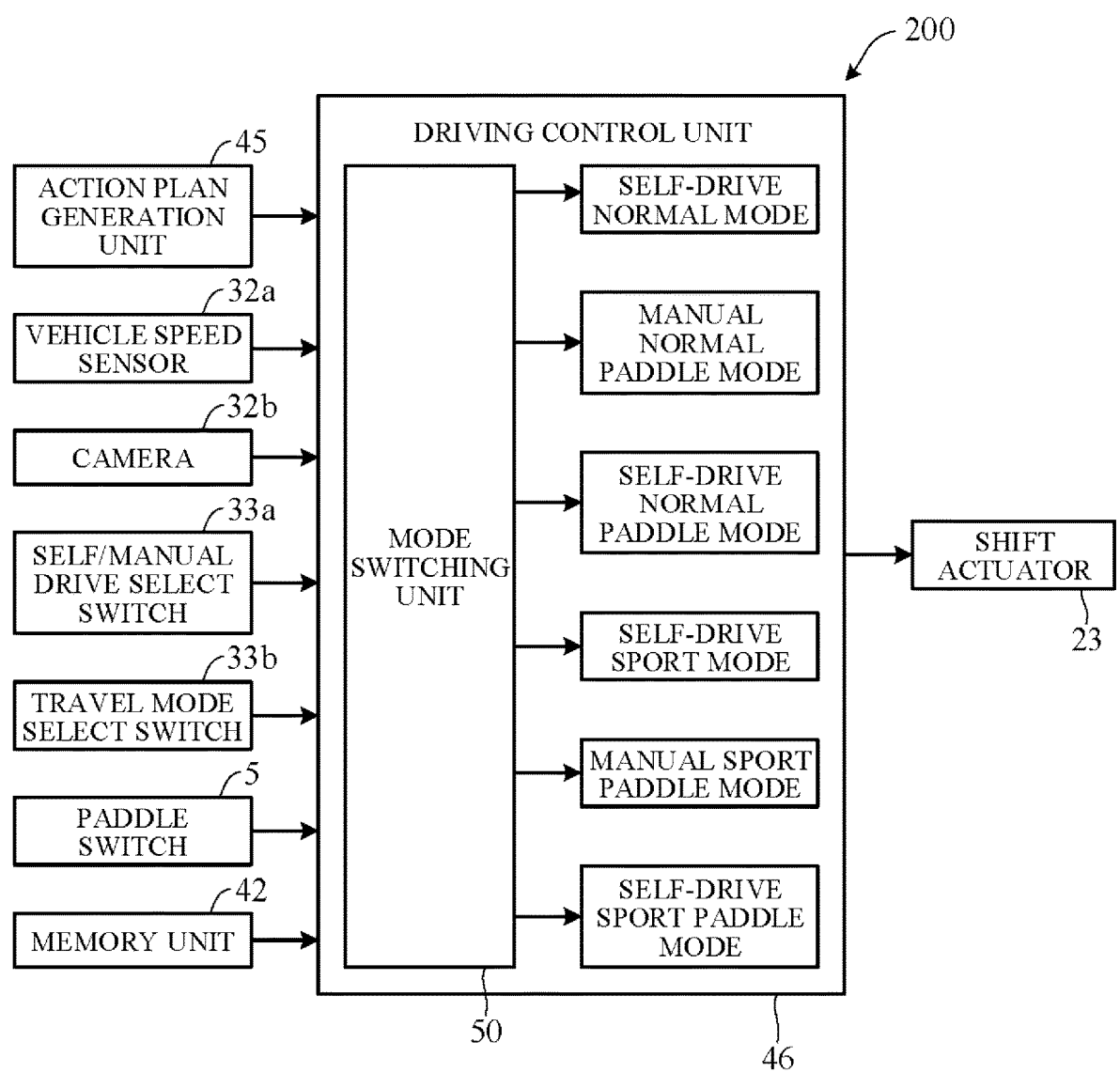
FIG. 8 is a block diagram showing main components of a vehicle transmission control apparatus according to the embodiment of the present invention.

FIG. 8 is a block diagram showing main components of a vehicle transmission control apparatus 200 according to the embodiment of the present invention, particularly functional configurations related to shift control by the driving control unit 46 in self-drive mode. As shown in FIG. 8, the driving control unit 46 receives input signals from the action plan generation unit 45 (FIG. 2), a vehicle speed sensor 32*a* (member of the internal sensor group 32), a camera 32*b* for photographing the drivers face (member of the internal sensor group 32), a self/manual drive select switch 33*a* (member of the input-output unit 33), a travel mode select switch 33*b* (member of the input-output unit 33), the paddle switches 5 (members of the input-output unit 33), and the memory unit 42 (FIG. 2).

The driving control unit 46 includes a mode switching unit 50. The mode switching unit 50 operates in response to a signal input to the driving control unit 46 to switch drive mode to one of the self-drive modes, i.e., to one among self-drive normal mode, manual normal paddle mode, self-drive normal paddle mode, self-drive sport mode, manual sport paddle mode, and self-drive sport paddle mode. Here, manual normal paddle mode and manual sport paddle mode as self-drive mode are not different from manual normal mode and manual sport mode as manual drive mode.

Figure 9:
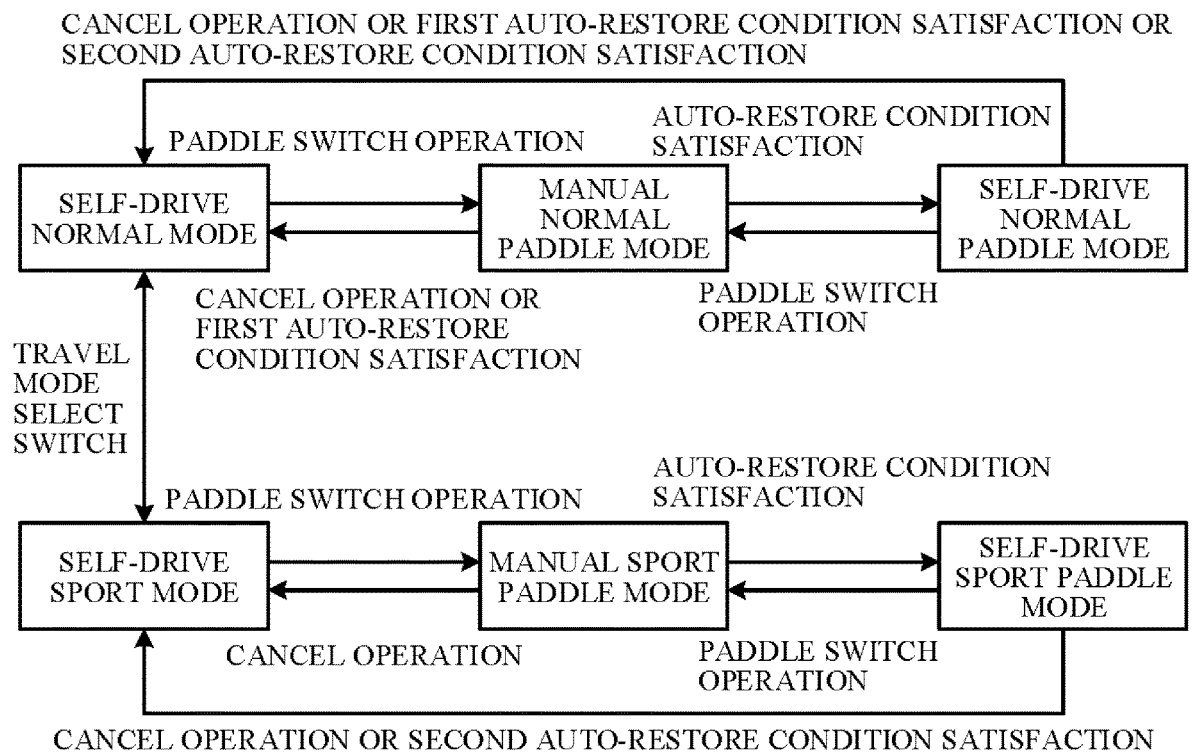
FIG. 9 is a transition diagram of drive modes in the self-drive mode by a vehicle transmission control apparatus according to the embodiment of the present invention.

FIG. 9 is a transition diagram of drive modes in a self-drive mode. When the self/manual drive select switch 33*a* is turned ON in manual drive mode, the mode switching unit 50 switches drive mode to self-drive normal mode of FIG. 9, irrespective of which state among the manual normal mode, normal paddle mode, manual sport mode and sport paddle mode of FIG. 6 is in effect. Therefore, paddle mode (normal paddle mode or sport paddle mode of FIG. 6) is automatically canceled by the switch to self-drive mode with no need for a long press operation of the paddle switch 5. In self-drive normal mode, shift operation of the transmission is controlled in accordance with a shift map stored in the memory unit 42 in advance.

FIGS. 10 and 11 are diagrams showing examples of shift maps used in self-drive mode. FIG. 10 shows characteristic curves f3 to f6 in normal mode, and FIG. 11 shows characteristic curves f7 to f10 in sport mode. The characteristic curves f3 to f10 are stored in the memory unit 42 in advance.

The characteristic curves f3 and f4 of FIG. 10 are, for example, downshift and upshift characteristic curves identical to the characteristic curves in manual normal mode (characteristic curves f1 and f2 of FIG. 4). The characteristic curves f5 and f6 are downshift and upshift characteristic curves set farther toward higher vehicle speed side than characteristic curves f3 and f4, and are, for example, downshift and upshift characteristic curves identical to characteristic curves in manual sport mode. Characteristic curves f7 and f8 of FIG. 11 are downshift and upshift characteristic curves set farther toward higher vehicle speed side than characteristic curves f3 and f4. Characteristics curves f9 and f10 are downshift and upshift characteristic curves set farther toward higher vehicle speed side than characteristic curves f5 and f6 and higher vehicle speed side than characteristic curves f7 and f8.

In self-drive normal mode, the transmission 2 is downshifted and upshifted in accordance with the characteristic curves f3 and f4 of FIG. 10. As shown in FIG. 9, when a paddle switch 5 is operated in self-drive normal mode, the mode switching unit 50 switches travel mode to manual normal paddle mode. In manual normal paddle mode, similarly to in normal paddle mode of FIG. 6, the transmission 2 is upshifted or downshifted in response to operation of the paddle switches 5. In this state, when a cancel operation is performed by long pressing a paddle switch 5, or when a first auto-restore condition is satisfied, the mode switching unit 50 switches (restores) travel mode to self-drive normal mode. The first auto-restore condition is, for example, the same as the auto-restore condition of FIG. 6.

When a predetermined auto-switch condition is satisfied in manual normal paddle mode, the mode switching unit 50 switches travel mode from manual normal paddle mode to self-drive normal paddle mode. The auto-switch condition is established when a first predetermined time period Δt1 (e.g., 10 sec) elapses after a paddle switch 5 is last operated or when downshift is determined to be necessary owing to increase of required driving force calculated based on an action plan. Establishment or not of an auto-switch condition is determined by the mode switching unit 50.

In self-drive normal paddle mode, the transmission 2 is upshifted or downshifted in accordance with characteristic curve f5 or f6 of FIG. 10. Since characteristic curves f5 and f6 are set on higher vehicle speed side than characteristic curve f3 and f4, downshift time is advanced and upshift time is delayed. As a result, more responsive driving performance, i.e., driving performance more strongly emphasizing power performance, can be achieved than in self-drive normal mode. This enables easy vehicle 102 overtake traveling and the like in accordance with action plan.

In self-drive normal paddle mode, the mode switching unit 50 switches travel mode to manual normal paddle mode when a paddle switch 5 is operated. Therefore, upshift and downshift are performed in accordance with operation of the paddle switches 5. On the other hand, in self-drive normal paddle mode, the mode switching unit 50 switches (restores) travel mode to self-drive normal mode when a cancel operation is performed by long press operation of a paddle switch 5, when the aforesaid first auto-restore condition is established, or when a second auto-restore condition is established.

The second auto-restore condition is established when the driver is determined to have no intention to operate the paddle switches 5. Specifically, the second auto-restore condition is established when a second predetermined time period Δt2 elapses after transition to self-drive normal paddle mode, i.e., when self-drive normal paddle mode has continued for the second predetermined time period Δt2, and cruise mode is ON. Second predetermined time period Δt2 is set to a time period longer than first predetermined time period Δt1, e.g., to a time period of 5 minutes. Cruise mode is determined to be ON when acceleration of the subject vehicle 101 calculated from a signal from the vehicle speed sensor 32a is 0 or substantially 0 continuously for a third predetermined time period Δt3 (e.g., 3 seconds) or when vehicle speed itself is constant or substantially constant for the third predetermined time period Δt3. Moreover, the second auto-restore condition is also assumed to be established when the driver is deemed to have no intention to operate the paddle switches 5 because the driver is determined not to be looking ahead as judged from the fact that the driver's line-of-sight determined from a camera 32b image is not directed ahead. In such a case, the second auto-restore condition is judged to be established irrespective of whether the second predetermined time period Δt2 elapsed. Establishment or not of the second auto-restore condition is determined by the mode switching unit 50.

Thus when the paddle switches 5 are not operated for the second predetermined time period Δt2 or longer and cruise mode is ON, or when the driver is not looking ahead, self-drive normal paddle mode is automatically restored to self-drive normal mode. As a result, characteristics of the downshift curve and characteristics of the upshift curve are both shifted to low vehicle speed side (curve f5→curve f3; curve f6→curve f4), whereby downshift time is delayed and upshift time is advanced. Therefore, since engine speed is held down, fuel economy performance and noise reduction performance are enhanced.

When the self/manual drive select switch 33a is turned OFF during traveling in manual normal paddle mode, the mode switching unit 50 switches travel mode to normal paddle mode (FIG. 6). At this time, drive mode (travel mode) can be smoothly switched because the same speed stage is maintained between before and after the switch from self-drive mode (manual normal paddle mode) to manual drive mode (normal paddle mode).

In order to perform such smooth switching, the driver may in advance of operating the self/manual drive select switch 33a sometimes operate the paddle switches 5 in self-drive mode as a preparatory operation for switching from self-drive mode to manual drive mode. At this time, the desired speed stage (manual normal paddle mode) is maintained, except in a case where downshift is determined to be required within first predetermined time period Δt1 following operation of the paddle switch 5. Therefore, when the self/manual drive select switch 33a is turned OFF within first predetermined time period Δt1 following operation of the paddle switch 5, transition from self-drive mode to manual drive mode can be smoothly achieved while maintaining the driver's intended speed stage. On the other hand, when the self/manual drive select switch 33a is turned OFF during traveling in self-drive normal mode or self-drive normal paddle mode, the mode switching unit 50 switches drive mode to manual normal mode (FIG. 6).

As shown in FIG. 9, when the travel mode select switch 33b is turned ON in self-drive normal mode, the mode switching unit 50 switches to self-drive sport mode. In self-drive sport mode, shift operation of the transmission is controlled in accordance with characteristic curves (characteristic curves f7 and f8 in FIG. 11) whose downshift curve and upshift curve are shifted farther to high vehicle speed side than those in self-drive normal mode. When a paddle switch 5 is operated in this state, the mode switching unit 50 switches travel mode to manual sport paddle mode. Therefore, the transmission 2 is upshifted and downshifted in response to operation of the paddle switches 5. On the other hand, when a paddle switch 5 is long pressed to perform a cancel operation in manual sport paddle mode, the mode switching unit 50 switches (restores) travel mode to self-drive sport mode.

In manual sport paddle mode, when an auto-switch condition like one in manual normal paddle mode is satisfied, the mode switching unit 50 shifts travel mode from manual sport paddle mode to self-drive sport paddle mode. As a result, shift operation is controlled in accordance with a shift map (characteristic curves f9 and f10 in FIG. 11) whose downshift curve and upshift curve are shifted farther to high vehicle speed side than those in self-drive sport mode.

In self-drive sport paddle mode, the mode switching unit 50 switches travel mode to manual sport paddle mode when a paddle switch 5 is operated. In self-drive sport paddle mode, the mode switching unit 50 switches (restores) travel mode to self-drive sport mode when a cancel operation is performed by long press operation of a paddle switch 5 or when a second auto-restore condition like one in self-drive normal paddle mode is satisfied.

When the self/manual drive select switch 33a is turned OFF during traveling in manual sport paddle mode, the mode switching unit 50 switches travel mode to sport paddle mode (FIG. 6). When the self/manual drive select switch 33a is turned OFF during traveling in self-drive sport mode or self-drive sport paddle mode, the mode switching unit 50 switches travel mode to manual sport mode (FIG. 6).

When in paddle mode during a self-drive mode, i.e., in manual normal paddle mode, self-drive normal paddle mode, manual sport paddle mode or self-drive sport paddle mode, the display control unit 47 lights the display portion 48 (FIG. 2) of the display (input-output unit 33) for displaying the speed stage and displays the current speed stage. Also when paddle mode is implemented in a manual drive mode, i.e., in normal paddle mode or sport paddle mode, the display control unit 47 lights the display portion 48 and displays the current speed stage. In other drive modes, the display portion 48 is extinguished. Use of the display portion 48 in this manner enables the driver to easily ascertain whether the travel mode is paddle mode. Moreover, the fact that the speed stage can be easily recognized during paddle mode enables the driver to decide whether speed ratio needs to be shifted by operation of the paddle switches 5.

Figure 12:
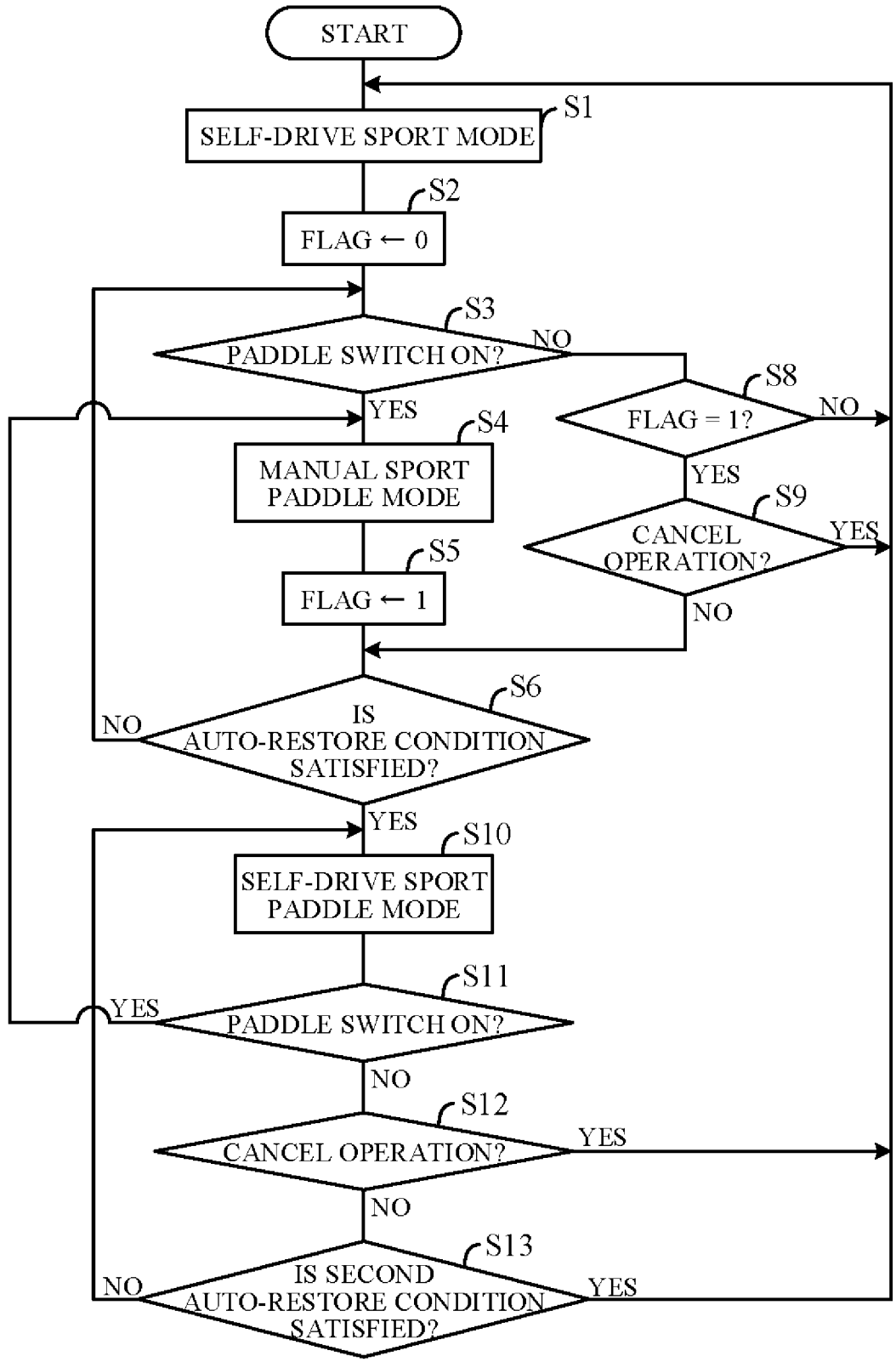
FIG. 12 is a flowchart showing an example of a processing performed by a processing unit of FIG. 2.

FIG. 12 is a flowchart showing an example of processing performed by the processing unit 41 (microprocessor) of the controller 40 (FIG. 2) in accordance with a program stored in the memory unit 42 in advance, particularly processing in the mode switching unit 50 (FIG. 8). The processing indicated in this flowchart is commenced in manual drive mode, for example, when both the self/manual drive select switch 33a and the travel mode select switch 33b are turned ON.

First, in S1 (S: processing Step), the microprocessor switches travel mode to self-drive sport mode (FIG. 9). Next, in S2, the microprocessor resets a flag is to 0. Next, in S3, the microprocessor determines whether a paddle switch 5 has been turned ON. If a positive decision is made at S3, the routine proceeds to S4, in which the microprocessor switches travel mode to manual sport paddle mode. In this mode, the transmission 2 is downshifted and upshifted in response to operation of the paddle switches 5. Next, in S5, the microprocessor sets the flag to 1, and in S6, and determines whether an auto-switch condition is satisfied. If a negative decision is made at S6, the routine returns to S3.

If a negative decision is made at S3, the routine proceeds to S8, in which the microprocessor determines whether the flag is set to 1. If a positive decision is made at S8, the routine proceeds to S9, and if a negative decision is made, returns to S1. In S9, the microprocessor determines whether a cancel operation has been performed. If a positive decision is made at S9, the routine returns to S1. As a result, manual sport paddle mode is restored to self-drive sport mode. If a negative decision is made at S9, the routine proceeds to S6.

If a positive decision is made at S6, the routine proceeds to S10. In S10, the microprocessor switches travel mode to self-drive sport paddle mode. Next, in S11, the microprocessor determines whether a paddle switch 5 has been turned ON. If a negative decision is made at S11 is YES, the routine proceeds to S4. As a result, travel mode is switched to manual sport paddle mode. If a negative decision is made at S11, the routine proceeds to S12, in which the microprocessor determines whether a cancel operation has been performed. If a positive decision is made at S12, the routine returns to S1. This restores travel mode to self-drive sport mode.

If a negative decision is made at S12, the routine proceeds to S13, in which the microprocessor determines whether a second auto-restore condition is satisfied. If a positive decision is made at S13, the routine returns to S1. As a result, travel mode is restored to self-drive sport mode. When a negative decision is made at S13, the routine returns to S10.

Although omitted in the drawing, an OFF operation of the travel mode select switch 33b terminates the processing of FIG. 12, whereupon travel mode is switched to self-drive normal mode. Processing performed after switching to self-drive normal mode is substantially the same as that in FIG. 12. Moreover, an OFF operation of the manual/self drive select switch 33a terminates the processing of FIG. 12, whereupon processing of an unshown manual drive mode is performed.

Figure 13:
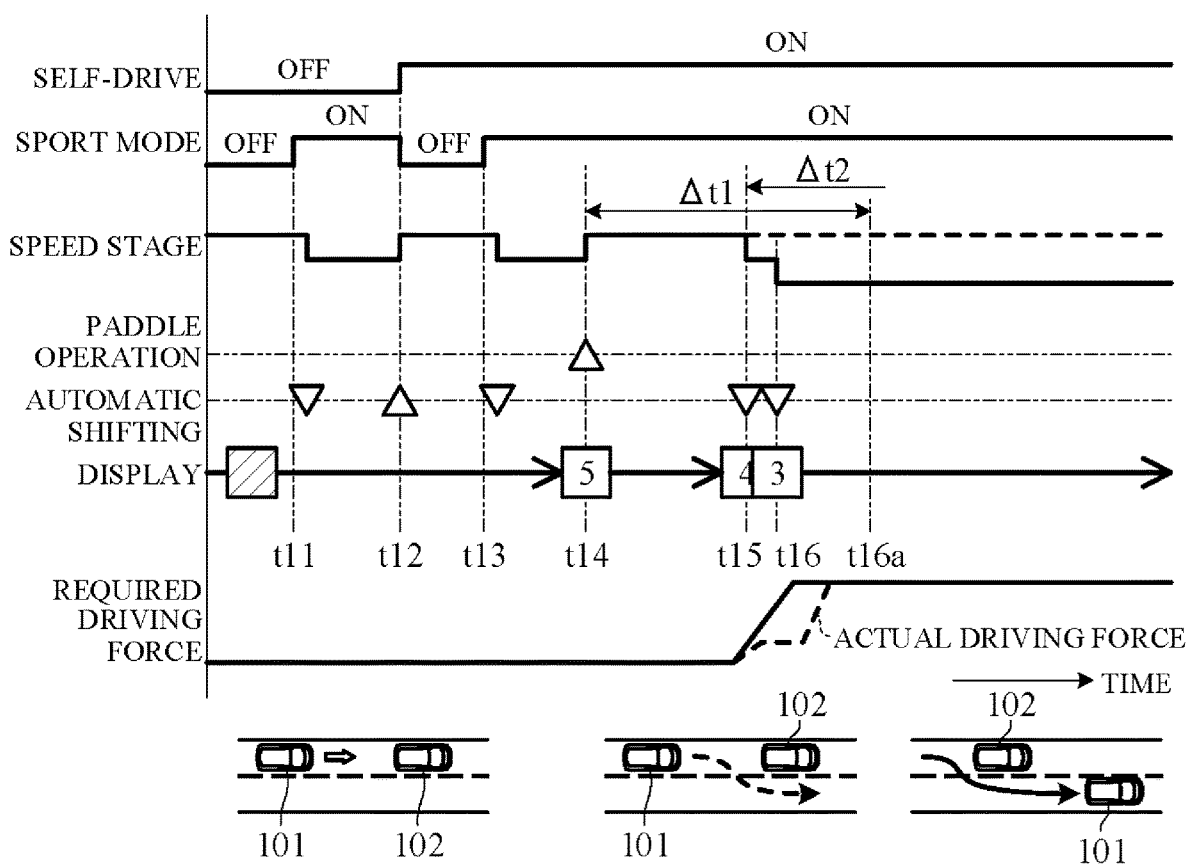
FIG. 13 is a time chart showing an example of operation in a case where operation of an upshift switch in a self-drive sport mode is followed by acceleration for overtaking a vehicle.

Operation of the vehicle transmission control apparatus according to the embodiment of the present invention is concretely explained in the following with reference to time charts of FIGS. 13 to 16. FIG. 13 is a time chart showing an example of operation in a case where operation of the upshift switch 5a in self-drive sport mode is followed by acceleration for overtaking the vehicle 102. The operation of FIG. 13 is commenced during 5th speed traveling with both the self/manual drive select switch 33a and the travel mode select switch 33b OFF. Display portion 48 for displaying current speed stage is unlit at this time.

As shown in FIG. 13, when the travel mode select switch 33b is turned ON at time t11, travel mode switches to sport mode, and when the self/manual drive select switch 33a is turned ON at time t12, travel mode (drive mode) switches to self-drive mode. At this time, the travel mode select switch 33b turns OFF automatically and travel mode switches from sport mode to normal mode (self-drive normal mode). Moreover, in the example of FIG. 13, the transmission 2 is upshifted at time t12 in accordance with characteristic curve f4 (FIG. 10). When the travel mode select switch 33b is thereafter turned ON at time t13, travel mode switches to sport mode (self-drive sport mode) (S1).

When the upshift switch 5a is operated from this state at time t14, the transmission 2 upshifts to 5th speed (S4), and a numeral indicating speed stage (e.g., numeral "5" indicating 5th speed stage) is lit on the display portion 48. With time t14 as starting point, and before first predetermined time period Δt1 elapses at time t16, required driving force of the subject vehicle 101 under an action plan for overtaking the vehicle 102 increases to cross downshift characteristic curve f7, thus establishing an auto-switch condition and prompting transition to self-drive sport paddle mode (S10). Following this, the transmission 2 downshifts to 4th speed at time t15 and to 3rd speed at time t16 in accordance with downshift characteristic curve f9 (FIG. 11) set farther toward higher vehicle speed side than characteristic curve f5 (FIG. 10) during self-drive sport mode. As a result, downshift occurs earlier than during self-drive sport mode and actual driving force increases as indicated by a dashed line, whereby the vehicle 102 can be easily overtaken. Second predetermined time period Δt2 is clocked from time t15. Even when required driving force does not increase following time t14, travel mode is transitioned to self-drive sport paddle mode when an auto-switch condition is established by elapse of first predetermined time period Δt1 at time t16a (S10).

Figure 14:
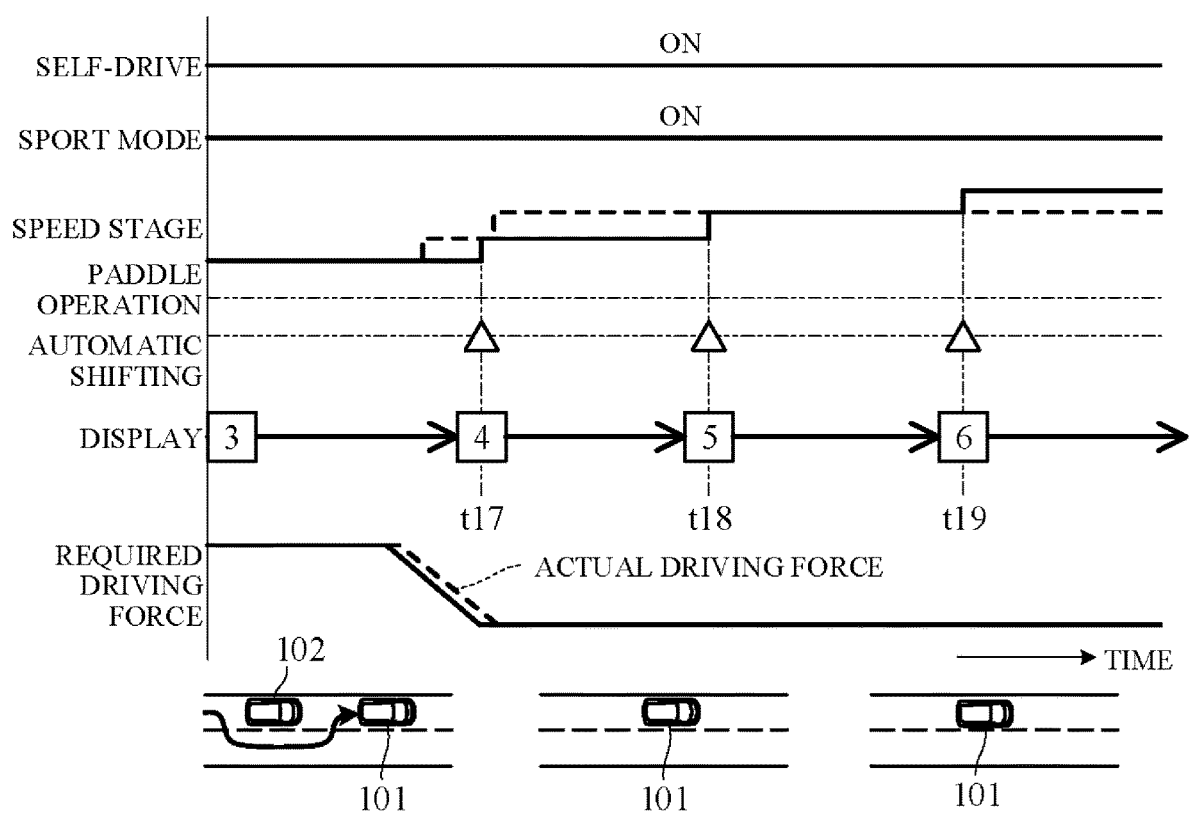
FIG. 14 is a time chart showing an example of operation occurring following the operation in FIG. 13.

FIG. 14 is a time chart showing an example operation in a case where the subject vehicle 101 travels in cruise mode after overtaking the vehicle 102, e.g., an example of operation occurring following the operation in FIG. 13. In self-drive sport paddle mode, when required driving force decreases after overtaking the vehicle 102, the transmission 2 successively upshifts in accordance with self-drive sport paddle mode characteristic curve f10 to 4th speed at time t17 and to 5th speed at time f18. Times of upshifts at this time are later than times of upshifts during self-drive sport mode indicated by a dashed line. Therefore, the driver experiences a driving feel similar to that in manual sport paddle mode.

Optionally, the driving control unit 46 can be adapted to determine in self-drive sport paddle mode whether a cruise traveling state of 0 or substantially 0 acceleration continued for a predetermined time or longer and upshift the transmission 2 when such a state is determined to have continued for the predetermined time or longer. With this configuration, the transmission 2 upshifts at time t19 of FIG. 14 even if before the operating point crosses characteristic curve f10, whereby engine speed can be held low and fuel economy enhanced. In this case, the driving control unit 46 is adapted to determine before upshifting the transmission 2 whether required driving force enabling cruise traveling can be achieved after upshifting and to maintain the transmission 2 in 5th speed without upshifting to 6th speed as indicated by a dashed line when it is determined not to be achievable.

Figure 15:
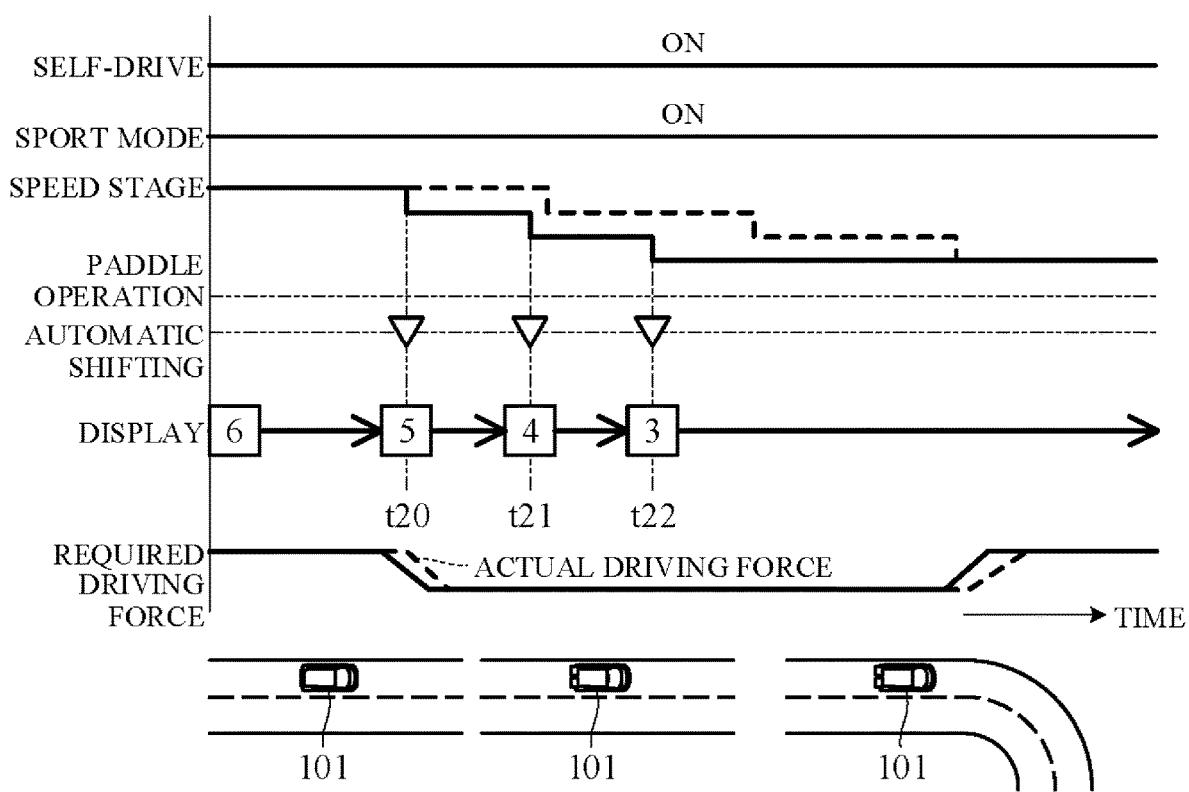
FIG. 15 is a time chart showing an example of operation occurring following the operation in FIG. 14.

FIG. 15 is a time chart showing an example of operation in a case where the subject vehicle 101 decelerates from cruise traveling ahead of a curve, e.g., an example of operation occurring following the operation in FIG. 14. In self-drive sport paddle mode, when decelerating from cruise traveling state, the transmission 2 successively downshifts in accordance with characteristic curve t9 (FIG. 11) from 6th speed to 5th speed at time t20, to 4th speed at time t21 and to 3rd speed at time t22. Times of downshifts at this time (solid line) are earlier than times of downshifts during self-drive sport mode (dashed line). This makes it possible, for example, to perform blipping downshift control earlier than traveling in self-drive sport mode.

Figure 16:
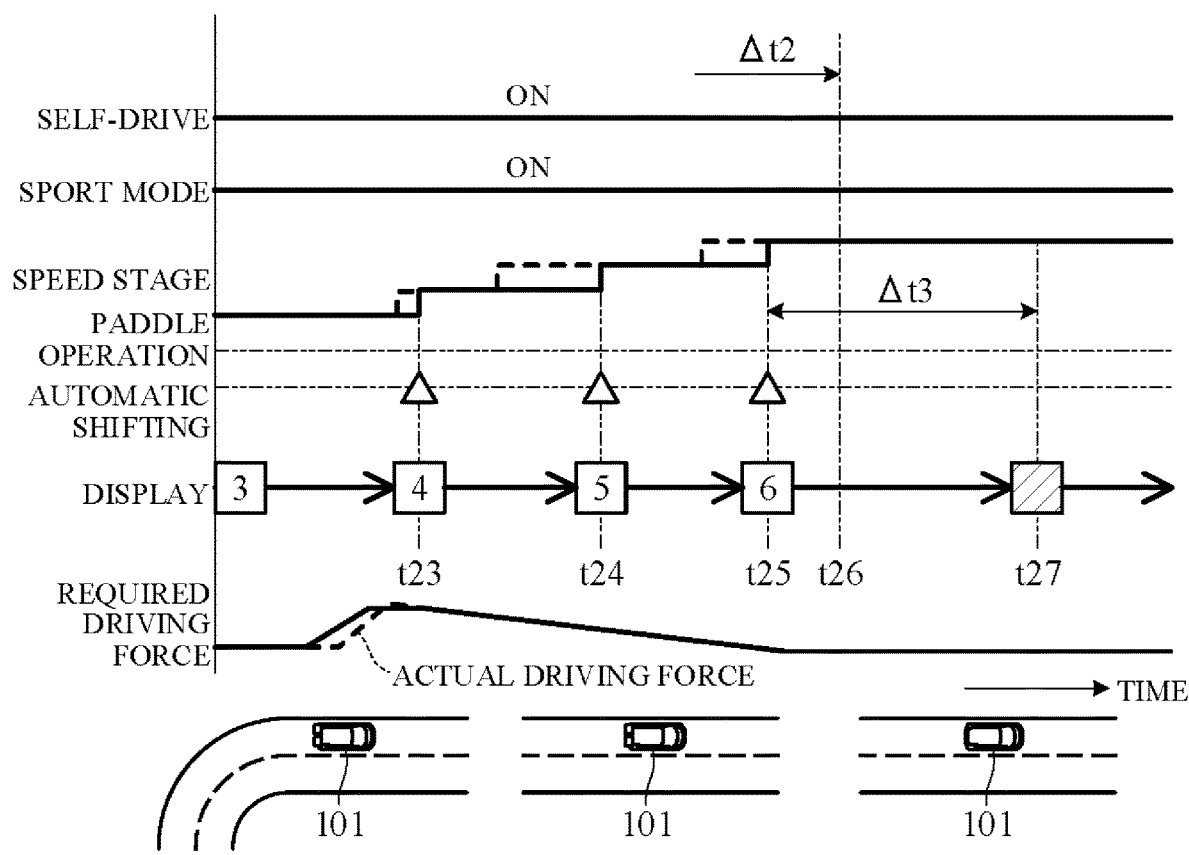
FIG. 16 is a time chart showing an example of operation occurring following the operation in FIG. 15.

FIG. 16 is a time chart showing an example of operation in a case where the subject vehicle 101 accelerates and travels in cruise state after passing through a curve, e.g., an example of operation occurring following the operation in FIG. 15. In self-drive sport paddle mode, when the subject vehicle 101 stops accelerating, required driving force gradually decreases and the transmission 2 successively upshifts in accordance with characteristic curve f10 (FIG. 11) from 3rd speed to 4th speed at time t23, to 5th speed at time t24 and to 6th speed at time t25. Times of upshifts at this time (solid line) are later than times of upshifts during self-drive sport mode (dashed line). Acceleration becomes 0 or substantially 0 at time t25.

Thereafter, second predetermined time period Δt2 following the switch to self-drive sport paddle mode at time t15 expires at time t26. At time t26, third predetermined time period Δt3 has not elapsed after time t25, so travel mode stays in self-drive sport paddle mode. At time t27, a second auto-restore condition is established owing to elapse of third predetermined time period Δt3 after acceleration became 0 or substantially 0. As a result, travel mode switches to self-drive sport mode (S1) and the display portion 48 is extinguished.

The present embodiment can achieve advantages and effects such as the following:

(1) The vehicle transmission control apparatus 200 for controlling a shift operation of the transmission 2 installed in the subject vehicle 101 having self-drive capability includes: the paddle switches 5 for outputting manual shift instructions to upshift and downshift the transmission 2; the driving control unit 46 for acquiring required driving force necessary for self-driving the subject vehicle 101 in accordance with an action plan based on data from the action plan generation unit 45; the vehicle speed sensor 32a for acquiring vehicle speed data; and the mode switching unit 50 for controlling shift operation of the transmission 2 based on a manual shift instruction output from the paddle switches 5, required driving force acquired by the driving control unit 46, and vehicle speed data acquired by the vehicle speed sensor 32a (FIG. 8). Before output of a manual shift instruction by the paddle switches 5, the mode switching unit 50 controls shift operation of the transmission 2, in self-drive sport mode for example, in accordance with predefined characteristic curve f7 or characteristic curve f8 (FIG. 11) using acquired required driving force and vehicle speed data, and when a manual shift instruction is output by a paddle switch 5, it controls shift operation, in manual sport paddle mode for example, in accordance with the instruction from the paddle switch 5, and when an auto-switch condition is established after the manual shift instruction is output by the paddle switch 5, it controls shift operation, in self-drive sport paddle mode for example, in accordance with predefined characteristic curve f9 or characteristic curve f10 (FIG. 11) using acquired required driving force and vehicle speed data (FIG. 9).

Owing to this configuration, shift operations reflecting the driver's intention can be achieve by operating the paddle switches 5, even when the subject vehicle 101 is driving in self-drive mode. Moreover, after drive mode is switched to manual sport paddle mode by operation of a paddle switch 5, it is automatically switched to self-drive sport paddle mode when an auto-switch condition is established, so that problems such as insufficient actual driving force when traveling to overtake the forward vehicle 102 can be prevented.

(2) The memory unit 42 in advance stores upshift characteristic curve f8 defining vehicle speed and required driving force for upshifting from n stage to n+1 stage in self-drive sport mode, first downshift characteristic curve f7 defining vehicle speed and required driving force for downshifting from n+1 stage to n stage in self-drive sport mode, upshift characteristic curve f10 set farther toward higher vehicle speed side than characteristic curves f8 to define vehicle speed and required driving force for upshifting from n stage to n+1 stage in self-drive sport paddle mode, and downshift characteristic curve f9 set farther toward higher vehicle speed side than characteristic curve f7 to define vehicle speed and required driving force for downshifting from n+1 stage to n stage in self-drive sport paddle mode. Therefore, since frequency of traveling in low speed stages increases during self-drive sport paddle mode, traveling with excellent paddle mode-like responsiveness is realized.

(3) When first predetermined time period Δt1 elapses after the last manual shift instruction output by a paddle switch 5, the mode switching unit 50 switches travel mode, for example, from manual sport paddle mode to self-drive sport paddle mode. Therefore, even in a case of no cancel operation being performed after operation of a paddle switch 5 in self-drive mode, travel mode is not fixed in paddle mode for a long time. In other words, the speed stage is not fixed in the speed stage selected by the paddle switch 5 for a long time. Therefore, a problem of actual driving force becoming deficient following upshift operation of the upshift switch 5a can be avoided.

(4) When a manual shift instruction is output by operation of a paddle switch 5 after travel mode is switched, for example, from manual sport paddle mode to self-drive sport paddle mode, the mode switching unit 50 switches (restores) travel mode from self-drive sport paddle mode to manual sport paddle mode. Moreover, elapse of second predetermined time period Δt2 (longer than first predetermined time period Δt1) with no operation of a paddle switch 5 from switching of travel mode from manual sport paddle mode to self-drive sport paddle mode, for example, is defined as a condition upon which the mode switching unit 50 switches from self-drive sport paddle mode to self-drive sport mode (FIG. 9). Therefore, the driver can shift to preferred speed stages by operating the paddle switches 5 even after travel mode is switched to self-drive sport paddle mode. In addition, upon determining from expiration of the second predetermined time period Δt2 that the driver does not intend to operate the paddle switches 5, travel mode is automatically switched from self-drive sport paddle mode prioritizing power performance to self-drive sport mode prioritizing balance between power performance and fuel economy performance.

(5) The vehicle transmission control apparatus 200 includes the self/manual drive select switch 33a (FIG. 8) for switching between a self-drive mode enabling self-drive functions and a manual drive mode disabling self-drive functions (FIG. 8). In a state switched to manual drive mode by the self/manual drive select switch 33a, the mode switching unit 50 responds to output of manual shift instructions from the paddle switches 5 by controlling shift operation in accordance with instructions from the paddle switches 5, and when self-drive mode is thereafter implemented by operation of the self/manual drive select switch 33a, travel mode is switched to self-drive normal mode and shift operation is controlled in accordance with characteristic curves f3 and f4 (FIGS. 6 and 9). Therefore, immediately after normal paddle mode or sport paddle mode in manual drive mode, for example, is switched to self-drive mode, paddle mode is reset. As a result, speed stage is controlled so as to output required driving force in accordance with the action plan even if the driver does not cancel paddle mode, thereby enabling good driving in self-drive mode.

Various modifications of the aforesaid embodiment are possible. Some examples are explained in the following. In the aforesaid embodiment, upshift and downshift of the transmission 2 in self-drive paddle mode (self-drive normal paddle mode and self-drive sport paddle mode) is performed in accordance with predetermined characteristic curves f5, f6, f9 and f10. However, these characteristic curves f5, f6, f9 and f10 can be modified taking driver preferences into consideration. For example, when the driver operates the upshift switch 5a in self-drive paddle mode before the transmission 2 automatically upshifts, the time of automatic upshifting can be advanced in ensuing instances. Also optionally, when the driver operates the downshift switch 5b after the transmission 2 automatically upshifts, the time of automatic upshifting can be delayed in ensuing instances. A more detailed explanation of this aspect follows.

Figure 17:
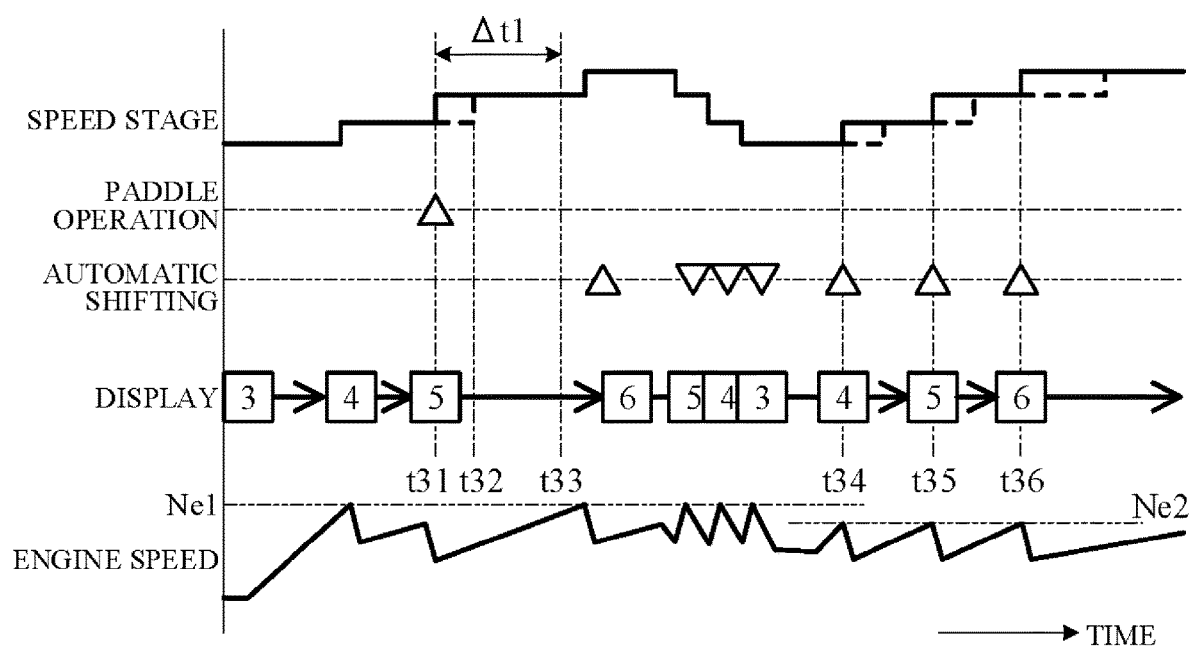
FIG. 17 is a time chart showing an example of change of timing upshifting automatically after the upshift switch is operated in the self-drive sport mode.
Figure 18:
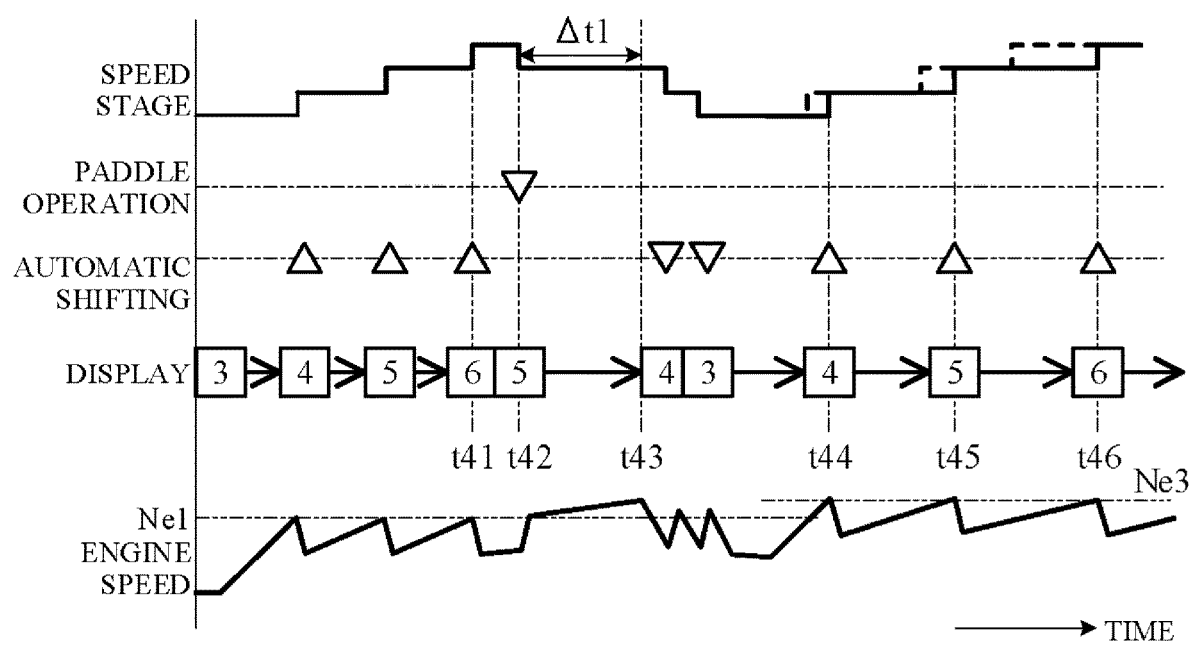
FIG. 18 is a time chart showing an example of change of timing upshifting automatically after a downshift switch is operated in the self-drive sport mode.

FIGS. 17 and 18 are time charts relating to self-drive paddle mode (e.g., self-drive sport paddle mode) showing time sequence changes in speed stage, upshift instruction (up-pointing triangle) and downshift instruction (down-pointing triangle) produced by operation of paddle switch 5 or automatic shifting, numeral on the display portion 48, and engine speed. As shown for self-drive sport paddle mode in FIG. 17, when the upshift switch 5a is operated at time t31, travel mode is shifted to manual sport paddle mode and the transmission 2 is upshifted in response to the paddle upshift request. Thereafter, at time t33 after elapse of first predetermined time period Δt1 following time t31, travel mode is restored to self-drive sport paddle mode.

Time t32 here indicates expected time of automatic upshift in accordance with characteristic curve f10 (FIG. 11). When the upshift switch 5a is operated at time t31, the transmission 2 upshifts earlier than time t32. The driving control unit 46 thereafter outputs a control signal to the memory unit 42 to modify the characteristic curve f10 so as to upshift the transmission 2 early in self-drive sport paddle mode. In other words, upshift characteristic curve f10 stored in the memory unit 42 is shifted toward low vehicle speed side.

The driving control unit 46 then automatically upshifts shift stage of the transmission 2 by one stage at times t34, t35 and t36, respectively. In other words, the driving control unit 46 upshifts the transmission 2 in accordance with characteristic curve f10 modified by shifting toward low vehicle speed side. Times of upshifts in this case (solid lines) are earlier than times of upshifts in accordance with characteristic curve f10 before modification (dashed lines). Therefore, engine speeds Ne2 at upshift times are lower than engine speeds Ne1 at upshift times before modification of the characteristic curve f10.

On the other hand, as shown for self-drive sport paddle mode in FIG. 18, when the downshift switch 5b is operated at time t42 after automatic upshifting of the transmission 2 at time t41, travel mode is shifted to manual sport paddle mode and the transmission 2 is downshifted in response to the paddle downshift request. Thereafter, at time t43 after elapse of first predetermined time period Δt1 following time t42, travel mode is restored to self-drive sport paddle mode.

In this case, the driver has probably operated the downshift switch 5b because the time of the automatic upshift seemed too early. Therefore, the driving control unit 46 modifies the upshift characteristic curve f10 stored in the memory unit 42 so as to delay upshift time of the transmission 2 in self-drive sport paddle mode. In other words, upshift characteristic curve f10 is shifted toward high vehicle speed side.

The driving control unit 46 then automatically upshifts shift stage of the transmission 2 by one stage at times t44, t45 and t46, respectively. In other words, the driving control unit 46 upshifts the transmission 2 in accordance with characteristic curve f10 modified by shifting toward high vehicle speed side. Times of upshifts in this case (solid lines) are later than times of upshifts in accordance with characteristic curve f10 before modification (dashed lines). Therefore, engine speeds Ne3 at upshift times are higher than engine speeds Ne1 at upshift times before modification of the characteristic curve f10.

Figure 19:
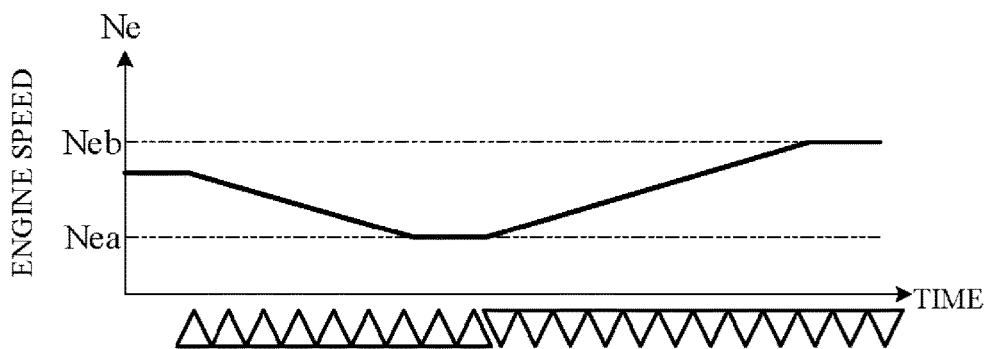
FIG. 19 is a diagram showing change of engine speed at time of upshift in the self-drive sport paddle mode in response to operation of the paddle switch.

FIG. 19 is a diagram showing change of engine speed Ne at time of upshift in self-drive sport paddle mode in response to operation of the upshift switch 5*a* and operation of the downshift switch 5*b*. As shown in FIG. 19, engine speed Ne at upshift time decreases with each successive operation of the upshift switch 5*a*. However, lower limit of engine speed Ne is held at minimum engine speed Nea enabling traveling. Moreover, engine speed Ne at upshift time increases with each successive operation of the downshift switch 5*b*. However, upper limit of engine speed Ne is held to a predetermined speed Neb.

Since the driving control unit 46 thus modifies upshift characteristic curve f10 during self-drive paddle mode (e.g., self-drive sport paddle mode) in accordance with time of output of manual speed stage shift instructions from the paddle switches 5, the transmission 2 can be automatically upshifted at times matched to driver preference. Therefore, the driver can be automatically offered a driving feel similar to that in manual paddle mode, and driver satisfaction is enhanced. Such modification is not limited to upshift characteristics but can also be similarly applied to downshift characteristics.

Optionally, instead of modifying characteristic curves f8 and f10 during self-drive paddle mode in response to driver operation of the paddle switches 5, upshift characteristics can be modified by enabling the driver to select desired characteristics from among multiple sets of upshift characteristics defined in advance. Such modification of characteristics in response to operations (selection) by the driver is not limited to upshift characteristics but can also be similarly applied to downshift characteristics. For example, multiple sets of upshift and downshift characteristics (shift models) named after celebrities (e.g., racers) can be made available so the driver can suitably modify upshift and downshift characteristics by choosing among them Although the apparatus of the aforesaid embodiment is adapted to switch to manual paddle mode (manual normal paddle mode or manual sport paddle mode) when the paddle switches 5 are operated in self-drive mode, the mode switching unit 50 can instead be adapted to determine whether to switch to manual paddle mode based on required driving force and other vehicle data and prohibit switching to manual paddle mode depending on the result of the determination. This aspect is explained below with reference to FIG. 20.

Figure 20:
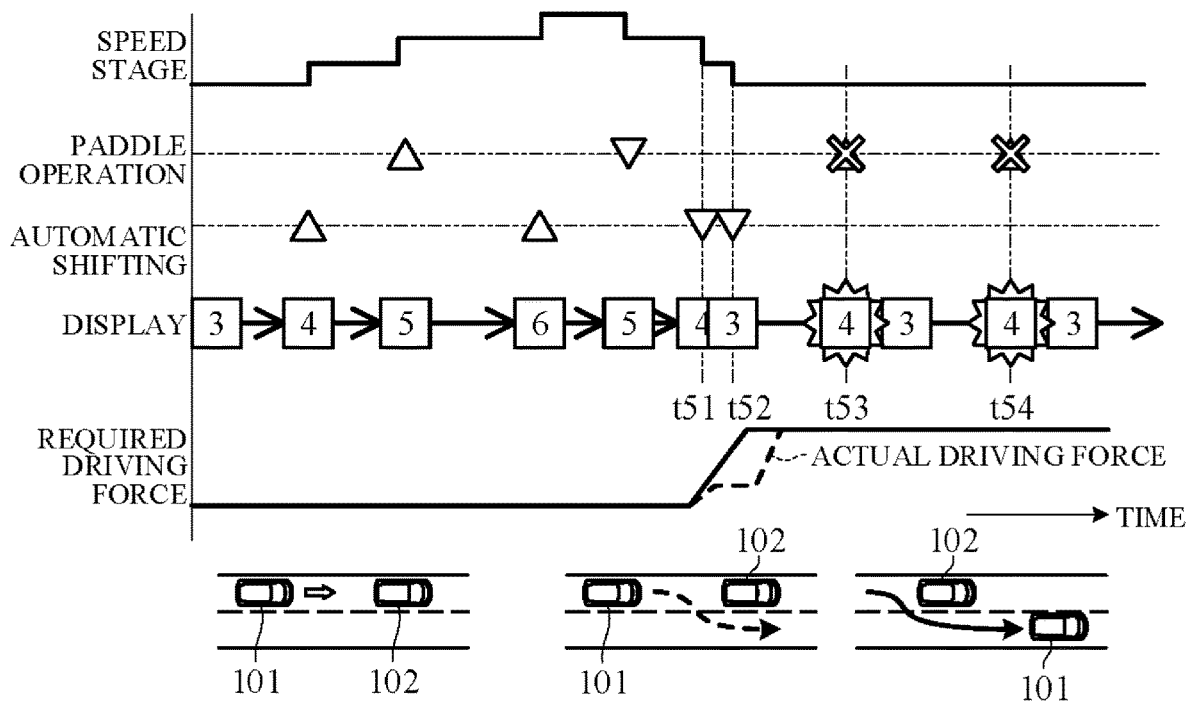
FIG. 20 is a time chart showing an example of operation for prohibiting switch to manual paddle mode during the self-drive mode.

FIG. 20 is a time chart showing an example of operation for prohibiting switch to manual paddle mode during self-drive mode driving. When, for example, the transmission 2 automatically downshifts in self-drive sport paddle mode at time t51 and time t52 in accordance with an action plan for overtake traveling the vehicle and the upshift switch 5*a* is thereafter operated at time t53, the mode switching unit 50 prohibits switching to manual sport paddle mode and maintains the post-downshift speed stage. In other words, the mode switching unit 50 is adapted to determine depending on required driving force not to allow upshift in such a case because upshifting would lower driving propulsive force and make overtake driving difficult. Switching to manual sport paddle mode is also similarly prohibited when the upshift switch 5*a* is operated at time t54. In such cases, the display control unit 47 briefly flashes the display portion 48.

Thus in operation according to the time chart of FIG. 20, the mode switching unit 50 determines based on required driving force, vehicle speed and other vehicle data whether to allow switching from self-drive paddle mode to manual paddle mode, and prohibits switching to manual paddle mode in response to operation of a paddle switch 5 when it determines not to allow switching. Therefore, in a case where, for example, upshift is instructed by erroneous operation of the paddle switch 5*a* during overtake traveling, upshift is prohibited and the subject vehicle 101 can continue overtake traveling unimpeded.

Alternatively, the mode switching unit 50 can be adapted not only to determine whether to allow switching from self-drive paddle mode to manual paddle mode but also to determine whether to allow switching from self-drive normal mode or self-drive sport mode to manual paddle mode and prohibit switching to manual paddle mode in response to operation of a paddle switch 5 when determining not to allow switching. Optionally, it possible when prohibiting switching to manual paddle mode in response to operation of a paddle switch 5 to prohibit switching not only when upshift is instructed by operation of the upshift switch 5*a* but also when downshift is instructed by operation of the downshift switch 5*b*.

Although the apparatus of the aforesaid embodiment is configured to instruct upshift and downshift by the paddle switches 5 provided on the steering wheel 6, a manual shift instructing portion to output upshift and downshift instructions based on instructions from the driver is not limited to this configuration. For example, a manual shift instructing portion can be configured so as to output a manual shift instruction by voice of the driver. In the aforesaid embodiment, the driving control unit 46 is adapted to acquire vehicle data including required driving force data and vehicle speed data, based on data from the action plan generation unit 45 and the vehicle speed sensor 32*a*. In other words, acquired data is used as vehicle information required for automatic shifting. However, a configuration for acquiring vehicle information is not limited to the aforesaid configuration and, for example, calculated vehicle speed from the action plan can be obtained as vehicle information.

In the aforesaid embodiment, when, in self-drive mode, the driving control unit 46 switches travel mode to self-drive normal mode or self-drive sport mode (a first travel mode) before a paddle switch 5 is operated and a paddle switch 5 is then operated, travel mode is switched to manual normal paddle mode or manual sport paddle mode (a second travel mode), and when an auto-switch condition (a mode switch condition) is thereafter established, travel mode is switched to self-drive normal paddle mode or self-drive sport paddle mode (a third travel mode). However, the driving control unit 46 (mode switching unit 50) serving as a shift controller is not limited to the aforesaid configuration.

The characteristic curves f3, f4, f7 and f8 (a first shift chart) stored in the memory unit 42 in advance and serving as references of shift operation in the self-drive normal mode and self-drive sport mode and the characteristic curves f5, f6, f9 and f10 (a second shift chart) stored in the memory unit 42 in advance and serving as references of shift operation in the self-drive normal paddle mode and self-drive sport paddle mode are not limited to the aforesaid ones. In other words, characteristic curves f4 and f8 (a first upshift curve) defining vehicle speed and required driving force for upshifting from n stage (a first shift stage) to n+1 stage (a second shift stage) and characteristic curves f3 and f7 (a first downshift curve) defining vehicle speed and required driving force for downshifting from n+1 stage to n+1 stage in non-paddle mode before a paddle switch 5 is operated, and characteristic curves f6 and f10 (a second upshift curve) defining vehicle speed and required driving force for upshifting from n stage to n+1 stage and characteristic curves f5 and f9 (a second downshift curve) defining vehicle speed and required driving force for downshifting from n+1 stage to n stage in self-drive paddle mode, are not limited to the aforesaid ones.

In the aforesaid embodiment, the mode switching unit 50 is adapted to switch from manual paddle mode to self-drive paddle mode when first predetermined time period $\Delta t1$ elapses from last operation of a paddle switch 5. However, a mode switch condition for automatic switching from a second travel mode to a third travel mode is not limited to the configuration. In the aforesaid embodiment, the mode switching unit 50 is adapted to switch from self-drive paddle mode (self-drive normal paddle mode or self-drive sport paddle mode) to self-drive normal mode or self-drive sport mode when second predetermined time period $\Delta t2$ elapses from switching from manual paddle mode to self-drive paddle mode and the vehicle travels in a cruise mode. However, switching from third drive mode to first drive mode can instead be performed solely on condition of the second predetermined time period $\Delta t2$ having elapsed.

Although the apparatus of the aforesaid embodiment is configured to switch between self-drive mode enabling self-drive functions and manual drive mode disabling self-drive functions in response to ON/OFF operation of the self/manual drive select switch 33a as a drive mode switching portion, the drive mode switching portion is not limited to the aforesaid configuration. Optionally, a self-driving vehicle can be configured with manual drive mode disabled, and in this case, a drive mode switching portion can be omitted. Although the apparatus of the aforesaid embodiment is configured to switch drive mode between normal mode and sport mode in response ON/OFF operation of the travel mode select switch 33b as a travel mode switching portion, it is possible, for example, to omit sport mode, and in this case, a travel mode switching portion can be omitted.

Although the aforesaid embodiment is explained with respect to an apparatus using a stepped transmission, the present invention can be similarly applied with respect to an apparatus using a continuously variable transmission. The present invention can also be used as a vehicle transmission control method for controlling a shift operation of a transmission installed in a self-driving vehicle having a self-driving capability.

The above embodiment can be combined as desired with one or more of the above modifications. The modifications can also be combined with one another.

According to the present invention, it is possible to appropriately perform shift operation reflecting a driver's intention for a self-driving vehicle.

Above, while the present invention has been described with reference to the preferred embodiments thereof, it will be understood, by those skilled in the art, that various changes and modifications may be made thereto without departing from the scope of the appended claims.

What is claimed is:

1. A vehicle transmission control apparatus for controlling a shift operation of a transmission mounted on a self-driving vehicle having a self-driving capability, comprising:
a manual shift instructing portion configured to output a manual shift instruction for upshifting or downshifting the transmission; and
an electric control unit including a microprocessor and a memory connected to the microprocessor,
wherein the microprocessor is configured to perform:
acquiring vehicle information including a required driving force data and a vehicle speed data necessary for self-driving the self-driving vehicle in accordance with an action plan; and
controlling the shift operation of the transmission based on the manual shift instruction output by the manual shift instructing portion and the vehicle information acquired in the microprocessor, wherein the controlling includes:
controlling the shift operation in accordance with a first shift chart stored in the memory in advance based on the vehicle information acquired in the microprocessor, in a first travel mode, before the manual shift instruction is output by the manual shift instructing portion;
controlling the shift operation in accordance with the manual shift instruction, in a second travel mode, when the manual shift instruction is output by the manual shift instructing portion; and
controlling the shift operation in accordance with a second shift chart stored in the memory in advance based on the vehicle information acquired in the microprocessor, in a third travel mode different from the first travel mode, when a predetermined mode switch condition is established after the manual shift instruction is output by the manual shift instructing portion, and
wherein the predetermined mode switch condition is established when a predetermined time elapses after the manual shift instruction is last output by the manual shift instructing portion.

2. The apparatus according to claim 1, wherein
the first shift chart includes a first upshift curve defining a relationship between a vehicle speed and a required driving force for upshifting from a first shift stage to a second shift stage, and a first downshift curve defining a relationship between the vehicle speed and the required driving force for downshifting from the second shift stage to the first shift stage,
the second shift chart includes a second upshift curve defining a relationship between the vehicle speed and the required driving force for upshifting from the first shift stage to the second shift stage and a second downshift curve defining a relationship between the vehicle speed and the required driving force for downshifting from second shift stage to the first shift stage, and
the second upshift curve is set at a higher vehicle speed side than the first upshift curve and the second downshift curve is set at a higher vehicle speed side than the first downshift curve.

3. The apparatus according to claim 1, wherein the predetermined time is a first predetermined time, and the microprocessor is configured to perform
the switching including switching the travel mode from the third travel mode to the second travel mode when the manual shift instruction is output by the manual shift instructing portion after switching the travel mode from the second travel mode to the third travel mode, and switching the travel mode from the third travel mode to the first travel mode when a second predetermined time longer than the first predetermined time elapses without the manual shift instruction being output by the manual shift instructing portion after switching the travel mode from the second travel mode to the third travel mode.

4. The apparatus according to claim 3, wherein the microprocessor is configured to perform
determining whether the self-driving vehicle travels in a cruise mode based on the vehicle information acquired in the microprocessor, and
the switching including switching the travel mode from the third travel mode to the first travel mode when the second predetermined time elapses without the manual shift instruction being output by the manual shift instructing portion after switching the travel mode from the second travel mode to the third travel mode and when it is determined that the self-driving vehicle travels in the cruise mode.

5. The apparatus according to claim 1, wherein the microprocessor is configured to perform
determining whether the self-driving vehicle stops or travels in a cruise mode based on the vehicle information acquired in the microprocessor, and
the switching including switching the travel mode from the second travel mode to the first travel mode when it is determined that the self-driving vehicle stops or travels in the cruise mode after the travel mode is switched to the second travel mode.

6. The apparatus according to claim 1, wherein the microprocessor is configured to perform
determining whether to permit switching of the travel mode from the first travel mode or the third travel mode to the second travel mode based on the vehicle information acquired in the microprocessor, and
the switching including prohibiting the travel mode from switching to the second travel mode when the manual shift instruction is output by the manual shift instructing portion, if it is determined not to permit switching of the travel mode to the second travel mode.

7. The apparatus according to claim 1, wherein the microprocessor is configured to perform
outputting a control signal to the memory to shift the second shift chart toward a lower vehicle speed side when the manual shift instruction for upshifting the transmission is output by the manual shift instructing portion before the transmission is upshifted in accordance with the second shift chart after the travel mode is switched to the third travel mode, and controlling the shift operation in accordance with the second shift chart shifted toward the lower vehicle speed side when the travel mode is switched to the third travel mode again.

8. The apparatus according to claim 1, wherein the microprocessor is configured to perform
outputting a control signal to the memory to shift the second shift chart toward a higher vehicle speed side when the manual shift instruction for downshifting the transmission is output by the manual shift instructing portion after the transmission is upshifted in accordance with the second shift chart after the travel mode is switched to the third travel mode, and controlling the shift operation in accordance with the second shift chart shifted toward the higher vehicle speed side when the travel mode is switched to the third travel mode again.

9. The apparatus according to claim 1, further comprising a drive mode switching portion configured to switch a drive mode between a self-drive mode enabling a self-driving function and a manual drive mode disabling the self-driving function,
wherein the microprocessor is configured to perform
controlling the shift operation of the transmission in accordance with the manual shift instruction when the manual shift instruction is output by the manual shift instructing portion in a state that the drive mode is switched to the manual drive mode by the drive mode switching portion, and when the drive mode is thereafter switched to the self-drive mode by the drive mode switching portion, switching the travel mode to the first travel mode and controlling the shift operation of the transmission in accordance with the first shift chart.

10. A vehicle transmission control method for controlling a shift operation of a transmission mounted on a self-driving vehicle having a self-driving capability, comprising:
outputting a manual shift instruction for upshifting or downshifting the transmission;
acquiring vehicle information including a required driving force data and a vehicle speed data necessary for self-driving the self-driving vehicle in accordance with an action plan; and
controlling the shift operation of the transmission based on the manual shift instruction and the vehicle information,
the controlling including:
controlling the shift operation in accordance with a predetermined first shift chart based on the vehicle information, in a first travel mode, before the manual shift instruction is output;
controlling the shift operation in accordance with the manual shift instruction, in a second travel mode, when the manual shift instruction is output; and
controlling the shift operation in accordance with a predetermined second shift chart based on the vehicle information, in a third travel mode, when a predetermined mode switch condition is established after the manual shift instruction is output,
wherein the predetermined mode switch condition is established when a predetermined time elapses after the manual shift instruction is last output by the manual shift instructing portion.

* * * * *